United States Patent
Akuon et al.

(10) Patent No.: US 11,258,491 B2
(45) Date of Patent: Feb. 22, 2022

(54) SYSTEMS AND METHODS FOR COMMUNICATION

(71) Applicants: Peter Odero Akuon, Nairobi (KE); Andrew Mwangi Kimani, Nairobi (KE)

(72) Inventors: Peter Odero Akuon, Nairobi (KE); Andrew Mwangi Kimani, Nairobi (KE)

(*) Notice: Subject to any disclaimer, the term of this patent is extended or adjusted under 35 U.S.C. 154(b) by 289 days.

(21) Appl. No.: 16/398,309

(22) Filed: Apr. 30, 2019

(65) Prior Publication Data
US 2019/0260441 A1 Aug. 22, 2019

Related U.S. Application Data

(63) Continuation of application No. PCT/IB2017/056785, filed on Nov. 1, 2017.

(51) Int. Cl.
| | |
|---|---|
| *H04B 7/04* | (2017.01) |
| *H04B 7/0456* | (2017.01) |
| *H04L 27/30* | (2006.01) |
| *H04B 7/06* | (2006.01) |
| *H04L 27/26* | (2006.01) |

(52) U.S. Cl.
CPC ......... *H04B 7/0482* (2013.01); *H04B 7/0604* (2013.01); *H04L 27/2634* (2013.01); *H04L 27/30* (2013.01)

(58) Field of Classification Search
CPC . H04B 7/0482; H04B 7/0604; H04L 27/2634; H04L 27/30

USPC .......................................................... 375/267
See application file for complete search history.

(56) References Cited

U.S. PATENT DOCUMENTS

| | | | | |
|---|---|---|---|---|
| 2007/0064590 A1* | 3/2007 | Prokop | ............... | H04L 27/2662 370/208 |
| 2011/0274198 A1* | 11/2011 | Cheng | ................... | H04L 1/0073 375/267 |
| 2016/0056984 A1* | 2/2016 | Li | ........................... | H04L 27/22 375/302 |

OTHER PUBLICATIONS

Written Opinion and International Search Report of the corresponding international application PCT/IB2017/056785.

* cited by examiner

*Primary Examiner* — Michael R Neff
(74) *Attorney, Agent, or Firm* — Isaac Rutenberg

(57) ABSTRACT

The invention discloses a method of conveying information from a sender to a receiver by use of various codeword patterns given in a mapping table and detection through decoding via the reverse mapping process. The codeword patterns may be selected as combinations of bits, frequencies, ports, or other elements as desired. Associated systems for carrying out the described encoding methods are also provided. The various methods may be applicable in low transmit power, energy-saving, secure, low latency, storage and in military, mobile, optical, deep space and fixed telecommunication systems for long range transmission and reliable information.

15 Claims, 10 Drawing Sheets

SYSTEMS AND METHODS FOR COMMUNICATION

CROSS-REFERENCE TO RELATED APPLICATIONS

This application claims priority to PCT Application Serial Number PCT/IB2017/056785, filed, 1 Nov. 2017, which application claims priority to the following provisional applications: KE/P/2016/002569, filed 1 Nov. 2016 and entitled "Colored Codeword Modulation"; KE/P/2017/002741, filed 4 Oct. 2017 and entitled "Colored Sequence Codeword Modulation"; KE/P/2017/002742, filed 4 Oct. 2017 and entitled "Colored OFDM Sequence Codeword Modulation"; and KE/P/2017/002740, filed 4 Oct. 2017 and entitled "Transmit Antenna Diversity Modulation". The entire contents of all of these applications are incorporated herein by reference.

TECHNICAL FIELD

This application relates generally to digital communication, signal processing, and information encoding.

BACKGROUND

Usually, repetition coding is known to be a very simple implementation for coding systems for long range communications and noisy environments. However, conventional repetition coding is known to perform poorly in Gaussian channels, where the same bit is directly transmitted several times and majority logic is used to select the estimated bit. Also the U.S. Pat. No. 9,197,374 B2 that claims priority Sep. 17, 2003 introduces a frequency domain repetition method with convolutionally encoded input data, which is complex due to convolution.

Another method that may be used to obtain more reliable information in noisy environments is known as colored coding in the Kenyan patent application KE/P/2016/0002541 of Aug. 5, 2016; where a set of parity bit patterns convey information and are detected at the receiver. However, colored coding requires more complex single-in single-out (SISO) decoding or sometimes multiple decoding steps at the receiver.

The method for modulation of a codeword in the European patent application EP20060005411 claiming priority of Mar. 16, 2006 refers to modulation of blocks of input bits, not single bits and the bits are modulated into higher order M-ary quadrature amplitude modulation symbols instead. Furthermore, the symbols are not orthogonal and repetition coding is not sustainable with them.

Generally, transmit antenna diversity in space is known to improve reliability of signals. Practically, since a base station often serves thousands of receivers, it is more economical to add antennas to base stations rather than to the receivers.

A delay diversity scheme was proposed by A. Wittneben in "Base Station Modulation Diversity for Digital SIMULCAST," Proceeding of the 1991 IEEE Vehicular Technology Conference (VTC 41 st), PP. 848-853, May 1991, and in "A New Bandwidth Efficient Transmit Antenna Modulation Diversity Scheme For Linear Digital Modulation," in Proceeding of the 1993 IEEE International Conference on Communications (IICC '93), PP. 1630-1634, May 1993. A base station transmits a sequence of symbols through one antenna, and the same sequence of symbols—but delayed—through another antenna.

U.S. Pat. No. 5,479,448, issued to Nambirajan Seshadri on Dec. 26, 1995, discloses a similar arrangement where a sequence of codes is transmitted through two antennas. The sequence of codes is routed through a cycling switch that directs each code to the various antennas, in succession. In this scheme, copies of the same symbol are transmitted through multiple antennas at different times, and both space and time diversity are achieved.

Furthermore, N. Seshadri, J. H. Winters, "Two Signaling Schemes for Improving the Error Performance of FDD Transmission Systems Using Transmitter Antenna Diversity," *Proceeding of the* 1993 *IEEE Vehicular Technology Conference* (VTC 43rd), pp. 508-511, May 1993; and J. H. Winters, "The Diversity Gain of Transmit Diversity in Wireless Systems with Rayleigh Fading," *Proceeding of the* 1994 *ICC/SUPERCOMM*, New Orleans, Vol. 2, PP. 1121-1125, May 1994.

Moreover, Tarokh, Seshadri, Calderbank and Naguib in U.S. application, Ser. No. 08/847,635, filed Apr. 25, 1997 (based on a provisional application filed Nov. 7, 1996), where symbols are encoded according to the antennas through which they are simultaneously transmitted, and are decoded using a maximum likelihood decoder. More specifically, the process at the transmitter handles the information in blocks of M1 bits, where M1 is a multiple of M2, i.e., M1=k*M2. It converts each successive group of M2 bits into information symbols (generating thereby k information symbols), encodes each sequence of k information symbols into n channel codes (developing thereby a group of n channel codes for each sequence of k information symbols), and applies each code of a group of codes to a different antenna.

Also, repetition coding is known to be a very simple implementation in transmission of information for applications in long range communications and in noisy environments. However, conventional repetition coding is known to perform poorly in Gaussian channels, where the same bit is directly transmitted several times and majority logic is used to select the estimated bit.

A well known transmit diversity scheme of USA, U.S. patent Ser. No. 09/074,224 is known to achieve a diversity order with multiplexed information rate. However, it is hard to apply the scheme to three antennas since dual transmissions are necessary. In addition, the scheme of U.S. patent Ser. No. 09/074,224 maintains a similar channel for two consecutive transmission, a fact that denies it a generalization for transmit diversity.

The next generation of communication systems will emphasize the following criteria in order to improve effective communication. High data rates are desired by users and the use of antenna multiplexing techniques, the use of frequency domain or wavelength modulation will be key. Reliable messages and signals require low bit error rates where low or root constellation diagrams will be preferred to higher order modulation schemes. Also, diversity paths through different antennas with novel transmission techniques will be required. Power consumption by the devices and latency is expected to go down and signal processing techniques that require less processing complexity are needed. As a result, root constellation symbols like binary phase shift-keying may be exploited together with frequency multiplexing that in the high bandwidth regime. The use of Fourier transforms may be preferred to channel coding in that case. In addition, low complexity hard-decision decoding will be a more useful approach that soft-decision decoding in terms of complexity. Securing communication will also be vital and diversity techniques combined with novel modulation systems are required.

The concept of channel coding has had a major input in communication engineering. Moreover, the evolution of generations of telecommunication systems and standards e.g. 2G, 3G and long-term evolution (LTE) has seen the adoption of such channel codes as low-density parity check codes (LDPC) and Turbo codes, which are broadly classified as block or convolutional codes. Presently, the discussions in 5G include Polar codes. These channel codes aid in correcting errors that may be caused due to poor signal strength, environmental noise and interference. Since Turbo codes were largely adopted for 3G and LTE, there is an ongoing debate as to whether alternative coding schemes should be adopted for the 5G. The main drivers of the debate are the concepts of high throughput and low complexities. The complexities can be classified into computational (latency) and implementation complexity (hardware resources and energy requirements). Furthermore, different classes of traffic in 5G require the channel code to offer high throughput, very low latency, high error correction capability, flexible data rates and moderate implementation complexity.

It is desired that 5G will offer 20 gigabits per second (Gbps) throughput at 0.5 millisecond (ms) latency with a single bit error in every 100 kilobits of information. Moreover, it has been noted that all these three channel codes compare rather fairly similarly except in the flexible data rates, where Turbo codes is more flexible and possesses a regular structure, which favours hybrid automatic repeat request (HARQ).

The main similarity in these three codes is that their reliability is achieved through the processing of conventional modulation of the phase, amplitude or frequency to decode the information bit through a fairly complex soft information processing. This concept is similar to processing information on the branches of a tree, which requires several paths to be evaluated in signal processing, thus increasing complexities. In fact, the computational complexities of Turbo, LDPC and Polar codes comprise maximum, minimum and addition (MaxMinAdd) operations.

In terms of data rates, there are some coding schemes that employ changes in frequency to convey information to the receiver. Some are referred to as spread spectrum like frequency hopping spread spectrum (FHSS), direct sequence spread spectrum (DSSS) and code division multiple access (CDMA). These spread spectrum methods spreads their signal in a pseudo random sequence, but the sequence is known at the receiver as well, and that does not convey information.

Systems like orthogonal frequency division multiplexing (OFDM) and many of its variants like index modulation with OFDM convey information to the receiver by using conventional binary phase-shift keying (BPSK) or higher order modulation in each subcarrier and summing the OFDM symbol through fast Fourier transforms (FFT) or such algorithms. Thus, OFDM is complex and the data rates are limited by the modulation type that is performed on the subcarriers. There are other similar systems like dual-tone multiple frequency and bit loading systems in asynchronous digital subscriber line (ADSL).

Frequency shift-keying (FSK) modulation and many of its variants also employ simple discrete Fourier transform (DFT) algorithms like the Goertzel algorithm to distinguish the mark-frequency that transmits a bit 1 and the frequency that transmits a bit 0. FSK is simple to implement via a switching oscillator, but, the data rates in FSK are limited to a single bit per frequency range. Multiple frequency-shift keying (MFSK) is a variation of frequency-shift keying (FSK) that uses more than two frequencies. MFSK is a form of M-ary orthogonal modulation, where each symbol consists of one element tone from an alphabet of orthogonal waveforms. M, the size of the alphabet, is usually a power of two so that each symbol represents (log 2M) bits.

MFSK is classed as an M-ary orthogonal signaling scheme because each of the M tone detection filters at the receiver responds only to its tone and not at all to the others; it is this independence provides the orthogonality.

Like other M-ary orthogonal schemes, the required energy-per-bit-to-noise ratio (Eb/N0) ratio for a given probability of error decreases as M increases without the need for multi-symbol coherent detection. In fact, as M approaches infinity the required Eb/No ratio decreases asymptotically to the Shannon limit of −1.59 dB. However this decrease is slow with increasing M, and large values are impractical because of the exponential increase in required bandwidth. Typical values in practice range from the limits of 4 to 64, and MFSK is combined with another forward error correction scheme to provide additional (systematic) coding gain. As a result, the peak data rates for MFSK are limited to (log 2M) bits of the number of sub-frequency channels or subcarriers.

Sequence coded modulation system in the Fifth IEEE International Conference on 3G Mobile Communication Technologies, London, UK, 2004 operates on demodulated symbol information at the receiver, instead of being used as a source of information for communication.

Considering the method of signal sequence estimation in the U.S. Pat. No. 9,515,710 B2, it is the combinations of multiple transmit antenna sequences that are detected or estimated but not implemented as source of information.

Notably, these prior state-of-the-art systems have lower data rates. Also the prior art codes either have code lengths which are too long and they employ high complexity soft-input soft-output (SISO) decoding, hence leading to high complexity in terms of processing energy and latency.

There are known coding schemes that employ changes in frequency to convey information to the receiver. Some are referred to as spread spectrum like frequency hopping spread spectrum (FHSS), direct sequence spread spectrum (DSSS) and code division multiple access (CDMA). These spread spectrum methods spread their signal in a pseudo random sequence, but the sequence is known at the receiver as well, and that sequence does not convey information to a receiver.

Systems like orthogonal frequency division modulation (OFDM) and many of its variants like index modulation with OFDM and generalized OFDM convey information to the receiver by using conventional binary phase-shift keying (BPSK) or higher order modulation in each subcarrier and summing the OFDM symbol through fast Fourier transforms (FFT) or such algorithms, with little increase in the conventional OFDM data rates. In addition, a large OFDM symbol is complex with high PAPR and the data rates are limited by the modulation type that is performed on the subcarriers. There are other similar systems like dual-tone multiple frequency and bit loading systems in asynchronous digital subscriber line (ADSL).

Index modulation techniques for next-generation wireless networks for OFDM systems in IEEE Access of Sep. 19, 2017 e.g., dual-mode OFDM (DM-OFDM), which depends on the rotation of the primary constellation, generalized (GDM-OFDM), which depends on various number of subcarriers with rotated primary constellations, multi-mode OFDM (MM-OFDM), which depends on permutations of the subcarrier indices, improve data rates by detecting the position of the transmitted sub-carrier, but do not depend on the sub-carrier sequences to convey information.

Notably, these prior state-of-the-art systems have lower data rates or more processing complexity or prone to interference.

SUMMARY OF INVENTION

This application relates generally to coding theory and increasing communication range and reliability in noisy environment, including codeword selection in radio and fixed communication systems. Signals being coded into the digital form can be in the form of sound, data, video, image or a group of them. Furthermore, the transmission medium could be radio frequency like in wireless communications, visible light or cable connections or other material.

This application relates generally to information transmission theory and increasing communication range and reliability in noisy and fading environment in wireless and fixed communication systems. Signals being coded into the digital form can be in the form of sound, data, video, image or a group of them. Furthermore, the transmission medium could be radio frequency like in wireless communications, visible light or cable connections or other material.

This invention relates generally to enhancement of data rates in communication systems. The invention finds application in coding theory, radio and fixed communication systems, especially in remote, deep-space and satellite systems. Signals being coded into the digital form can be in the form of sound, data, video, image or a group of them. Furthermore, the transmission medium could be radio frequency like in wireless communications, visible light or cable connections or other material.

The invention finds application in coding theory, radio and fixed communication systems, especially in remote, deep-space and satellite systems. Signals being coded into the digital form can be in the form of sound, data, video, image or a group of them. Furthermore, the transmission medium could be radio frequency like in wireless communications, visible light or cable connections or other material.

Colored Codewords

Low error communication for ultimate reliability in noisy channels, low implementation complexity and power saving for communication devices, especially remote, deep-space and satellite systems, provision of exact quality of service (QOS) evaluation e.g. bit error rates and secure channel communication for information secrecy are vital requirements in this sector.

Conventionally, at a sender's side, input information from a user is normally transformed into input bits. These input bits are used to select modulation symbols to be transmitted to the receiver. In essence, the input bits are actually transmitted to the receiver through the modulated symbols. As a result, the receiver will try to detect the received bits through all the modulation symbols. Normally, this conventional method results in errors that may only require channel coding to achieve reliable information in a given channel capacity.

Presently, turbo codes, low density parity check (LDPC) and polar codes are known to be some of the best performing practical codes in the communications industry. However, these state-of-the-art codes have code lengths which are too long and employ high complexity soft-input soft-output (SISO) decoding, thus leading to high complexity in terms of processing energy. There is higher implementation complexity in terms of application specific integrated circuit (ASIC) and field programmable gate array (FPGA).

It is an aim of the invention notably to overcome the limits of the prior art in channel coding.

According to one broad aspect of the present invention there is provided known codewords in a codeword set in a mapping table, which is used to compare with detected output bit stream at a receiver in a communication system comprising: an input source to provide the information input bit stream that needs to be conveyed to a receiver; an encoder at the sender to produce colored codewords to be selected by the input bit stream and produce an encoder output bit stream to be transmitted to the receiver through a communications channel after symbol modulation mapping is performed; or a colored codeword set known a priori to be selected by the input bit stream and according to a colored codeword set mapping table; a detector at the receiver to produce the estimates of the transmitted information, a comparator to compare a detected codeword with those in a de-mapping table and a de-mapper to read the detected input bits from the detected codeword.

In some embodiments, the information input bit stream at the input source is determined from intermediate frequency signal samples, or base-band samples, or video or sound or data.

In some embodiments, the information input bit stream selects the codeword from the colored codeword set according to the mapping strategy enlisted in a codeword mapping table at a sender.

In some embodiments, the information input bit stream selects the codeword from the colored codeword set according to the mapping strategy enlisted in a codeword mapping table, which is known both to the sender and the receiver.

In some embodiments, the encoding process at the sender is performed to produce the colored codewords or the codewords are produced a priori and stored, just to be selected by the input bit streams without undergoing the encoding process.

In some embodiments, the encoding process at the sender leads to an encoder output bit stream codeword, which is transmitted to the receiver, where encoding can be convolutional or block coding.

In some embodiments, the encoding process at the sender leads to an encoder output bit stream, which is transmitted to the receiver through a communications channel after any symbol modulation mapping is performed.

In some embodiments, the transmission of the same codeword is repeated over the channel to the receiver through a number of pre-determined repetitions known to both the sender and the receiver.

In some embodiments, the detection process at the receiver is performed by computing the likelihood ratio or selection of only the best hard decision of the sign of the amplitude of the received signal with highest power and storing the estimated information bits.

In some embodiments, the information input bit stream conveyed to the receiver is selected according to the de-mapping strategy enlisted in a codeword mapping table, which is known both to the sender and receiver.

In some embodiments, the colors of the codewords in the codeword set are designed by making the number of digit one in codeword to be widely different among the codewords in the set e.g. by being orthogonal, or different lengths of the patterns or different channel weights of an encoding parity generator matrix.

In some embodiments, the codewords from the codeword set are designed such that the entries are binary consisting of digit one or digit zero.

In some embodiments, transmission of the selected colored codeword is repeated in accordance to a preset number of times.

In some embodiments, selection detection is performed where the signal with the highest power is decoded and used to determine the transmitted codeword at the receiver, thus saving power and processing complexity.

In some embodiments, the selection detection and decoding is performed after a short transmission length of the bits in the selected codeword and does not have to wait for the conventional transmission of a very long frame of symbols, thus saving on network latency which is desired for future network and control systems.

In some embodiments, the codeword that is detected most of the time over all repetitions is selected through a process known as majority logic.

In some embodiments, the selected codeword is used to demap the corresponding input bit that was conveyed from the sender, using the de-mapping table, which is in the reverse operation of the mapping table.

Therefore, firstly, what makes the present invention non-obvious and inventive is the fact that, unlike the state-of-the-art communication coding methods, input bit information is not directly transmitted to the receiver, and a bit codeword selected by the input bit 0 is orthogonal to a bit codeword selected by the input bit 1. As a result, a detector at the receiver is able to detect the received bits and compare with the set of bit codeword patterns under a mapping table. Since the bit codeword patterns can be designed in several unique ways, the probability of error in selecting the correct pattern diminishes with repetitions even in Gaussian channels.

Secondly, a proposed selection decoding (SD) detector of colored codeword modulation is used without having to use a SISO decoder, thus less complex and spends less energy which is desired for the next generation network system for low energy and low latency grades. In SD, not all the bits in the codeword are decoded. A single bit detection process is made for the signal with the highest power, and that detected bit position in the bit codeword is used to decode the whole codeword. E.g. In the case of orthogonal codewords like (010) and (101), a single bit position in the codeword is sufficient to discriminate the two codewords.

Furthermore, it is easy for those familiar with the art that the present invention does not explicitly present a channel coding method, convolutional or block, but it presents a novel industrial design method and apparatus for coding information, where all the channel codes in the prior art may be used together with the present invention.

In addition, such a method in the present invention enhances information secrecy, since any eavesdropper can only decode multiple erroneous keys from the channel, but is unaware of the original key itself. The key can be defined in many ways including coding the secret key in the number the repetitions.

The inventive step is further stressed herewith. The colors or the codeword set requires unique codewords which contain enhanced hamming distance. The colors of the codeword may therefore be designed through encoding with parity bits or designed by varying the number of bit 1 and bit 0 in the codewords. The uniqueness of the codewords is what is referred to as the colors of the codewords. Improved data rates are obtained from compression of input bits and optimization algorithms on repetitions and coding on antennas.

Two main features are used to design the codeword in the set: map unique bits into the codewords of a given length N e.g. orthogonal sets of binary digits or let the codewords in the set to be of different and unique lengths.

In an aspect is a method for encoding, using a mapping table at a sender, an input bit 0 to a codeword type 1, where the codeword type 1 is a bit block containing a bit vector of bit 0 and bit 1 and encoding an input bit 1 to a codeword type 2; where the codeword type 2 is a bit block containing a bit vector of bit 0 and bit 1, but position of bit 0 and bit 1 in the codeword type 1 is not the same as the position of bit 0 and bit 1 in the codeword type 2, thus orthogonal codewords; and transmitting, decoding, comparing, de-mapping the encoded codeword and deciding an estimated input bit 0 or an estimated input bit 1 at a receiver. In embodiments:

comprising a step of repeating transmission of the encoded codeword through a channel between the sender and the receiver, where the number of repetitions is known to both the sender and the receiver;

comprising a step of repeating transmission of the encoded codeword through a channel between the sender and the receiver, where the number of repetitions is known to both the sender and the receiver and the bits in the bit vector of the encoded codeword type is transmitted, one bit at a time until all the bits in the encoded codeword type have been transmitted to the receiver;

where the transmitted codeword types are received as received signals at the receiver;

comprising a step of decoding, through a detector, the received signals of claim 4 by detecting one bit at a time; where only the received signal with the highest power is decoded as a bit 1 or a bit 0 and the position of that decoded bit in the received signals is recorded as a decoded bit position, a process which is referred to as selection decoding;

comprising a step of comparing, through a comparator, the decoded bit position to the position of bits in the known codeword types, and if the position of the decoded bit is similar to a position of a similar bit in a codeword in the known codeword types, then that codeword is selected as an estimated codeword type that was transmitted;

comprising a step of comparing, through a comparator, the decoded bit position to the position of bits in the known codeword types, and if the position of the decoded bit is similar to a position of a similar bit in a codeword in the known codeword types, then that codeword is selected as an estimated codeword type that was transmitted; and this process is repeated for all number of repetitions and the estimated codeword types are recorded;

comprising a step of de-mapping, through a de-mapping table, by reading out bit 0 or bit 1 that corresponds to each of the recorded estimated codeword types of claim 7; and all the bit 0 or bit 1 being read out for each estimated codeword type are recorded as output bit vector;

a step of deciding an estimated input bit to be a bit 0 or a bit 1 if the majority of the bits in the output bit vector is a bit 0 or a bit 1.

Antenna Diversity

It is an aim of the invention notably to overcome the limits of the prior art in transmit antenna diversity.

According to one broad aspect of the present invention bit 1 and bit 0 selects known codewords in a mapping table at a sender and are selected by known codewords in a de-mapping table at a receiver, given detected output bit stream from a detector at a receiver in a communication system comprising: an input source to provide information input bit stream that needs to be conveyed to a receiver; orthogonal codewords to be selected by the input bit stream as symbols to be transmitted by each transmit antenna to the receiver through a communications channel after symbol modulation mapping is performed; a detector at the receiver to produce the estimates of the transmitted information, a comparator to compare a detected codeword with those in the de-mapping table and a de-mapper to read the detected output bit stream from the detected codeword.

In some embodiments, the information input bit stream at the input source is determined from intermediate frequency signal samples, or base-band samples, or video or sound or data.

In some embodiments, the information input bit stream selects the codeword from the orthogonal codewords according to a mapping strategy enlisted in the mapping table at the sender.

In some embodiments, the information input bit stream selects the codeword from the colored codeword set according to the mapping strategy enlisted in a codeword mapping table, which is known both to the sender and the receiver.

In some embodiments, an encoding process at the sender is performed to produce the codewords or the codewords are produced a priori and stored, just to be selected by the input bit streams without undergoing the encoding process.

In some embodiments, the encoding process at the sender leads to an encoder output bit stream, which is transmitted to the receiver through a communications channel after any symbol modulation mapping is performed.

In some embodiments, the orthogonal codewords are designed such that the entries are binary consisting of binary digit one or binary digit zero.

In some embodiments, the transmission of the same codeword is repeated over the channel to the receiver through a number of pre-determined repetitions known to both the sender and the receiver.

In some embodiments, a detection process by the detector at the receiver is performed by computing different noise values for the orthogonal codewords, and selecting the codeword with the minimum noise value, as a detected codeword for that repeat time.

In some embodiments, the information input bit stream conveyed to the receiver is selected according to the de-mapping strategy enlisted in the de-mapping table, which is known both to the sender and the receiver.

In some embodiments, the detected codeword that is produced most of the time over all repetitions is selected through a process known as majority logic as the detected codeword for all repetitions.

In some embodiments, the detected codeword is used to demap the corresponding input bit that was conveyed from the sender, using the de-mapping table, which is in the reverse operation of the mapping table.

A method that may be used for more reliable information in noisy environments is known as colored codeword modulation and is described herein; where a set of orthogonal bit patterns convey information and are detected at the receiver. However, colored codeword modulation when applied to a single antenna does not provide a transmit diversity in space.

Indeed, a system is required to solve these problems of the prior art. The inventive step is further stressed herewith. (a) The method of the invention proposes to transmit information by mapping a bit to each transmit antenna, where the transmit antenna index does not carry all the information, since the conveyed information depends on the bits received from all the mapped transmit antennas; (b) Furthermore, the bit codeword that is mapped to convey a bit 0 is orthogonal to the bit codeword that is mapped to convey a bit 1; (c) The same codewords are then repeated in a given number of times for two or three or more antennas; (d) A detection method of the present invention is devised in a novel way, where it is the minimum noise levels on the pair of orthogonal bit codewords at the input that is detected in order to decode the conveyed information.

Since the conveyed information comes from different portions of a network of transmit antennas, transmit diversity is achieved in the space. Moreover, an eavesdropper at a location requires all the spatial information which becomes difficult to capture. The proposed method of the invention therefore provides tight security.

In an aspect is a method for encoding at a sender, an input bit 0 to a codeword type 1, where the codeword type 1 is a bit block containing a bit vector of bit 0 and bit 1 and encoding an input bit 1 to a codeword type 2; where the codeword type 2 is a bit block containing a bit vector of bit 0 and bit 1, but position of bit 0 and bit 1 in the codeword type 1 is not the same as the position of bit 0 and bit 1 in the codeword type 2, thus orthogonal codewords; modulating and mapping, transmitting, decoding, de-mapping the encoded codeword and deciding an estimated input bit 0 or an estimated input bit 1 at a receiver. In embodiments:

comprising a step of modulating all input bits in the bit vector to form modulated symbols, and mapping the modulated symbols through a mapping table, to be transmitted by respective transmit antennas;

comprising a step of repeating transmission of the modulated symbols through a channel between the sender and the receiver, where the number of repetitions is known to both the sender and the receiver;

where the transmitted codeword types are received as received signals at the receiver;

comprising a step of decoding, through a detector, the received signals of claim 4 by detecting a minimum noise signal formed from the two orthogonal codewords of type 1 and type 2; where only the noise signal with the smallest absolute value is detected as a codeword type 1 or type 2; and this step is repeated for all number of repetitions and the estimated codeword types are recorded;

comprising a step of de-mapping, through a de-mapping table, by reading out bit 0 or bit 1 that corresponds to each of the recorded estimated codeword types of claim 5; and all the bit 0 or bit 1 being read out for each estimated codeword type are recorded as output bit vector;

comprising a step of deciding an estimated input bit to be a bit 0 or a bit 1 if the majority of the bits in the output bit vector is a bit 0 or a bit 1.

Colored Sequence Modulation

This application introduces an inventive method and apparatus for increasing data rates at the receiver through the mapping and detection of frequency (tone) sequences as a source of information. This has the effect of providing additional data rates in the order of ($\log_2 Ms$) bits where the number of sequences Ms is greater than the alphabet M in the M-ary MFSK case, i.e. (Ms>M). For example, when M=2 in MFSK, Ms=4 on CSCM, which means at least two bits can be conveyed at a time instead of 1 bit as in MFSK. Plainly, MFSK provides less data rates as compared to OFDM, that maps at least M bits per OFDM symbol or generalised OFDM symbol.

A system is required to solve the problems of the prior art, especially in increasing data rates. The following are some of the advantages of CSCM and further illustrations of CSCM are given in terms of colored frequency sequence codeword modulation (CFCM), where the source is a single frequency carrier.

A similar method to CSCM is the method of colored codeword modulation described herein; where a set of all-parity and orthogonal bit patterns are detected at the receiver to convey information. However, colored codeword modulation is simple to implement and very good for reliability and long range under very short code lengths, but it does not increase data rates.

The invention of CSCM paradigm does not necessarily include conventional higher order modulation per sub-carrier in order to present additional data rates at the receiver. In its basic form, the proposed coding scheme is synonymous with processing information at the root of a tree. This coding technique is summarized as colored sequence codeword modulation, which is generalized under new design approach (GUNDA) for sequences with bits being read under a mapping table (RUT) i.e. Gunda rut coding.

Firstly, in its basic form, the new scheme encodes different colors of codeword or frequency based on a bit zero or a bit one from the digital input. As a result, information is detected from just a single dimension of frequency or ports or antennas.

Secondly, data rates in the proposed modulation are increased by mapping the input bits to the transmitted sequence. As a result, the sequence carries information since the transmitted sequence is not known at the receiver. Furthermore, in the case of CFCM, the sequences are detected by detecting each sub-carrier frequency value, which was independently transmitted.

Extremely high and flexible data rates: CSCM is designed such that it provides a large number of symbols per second in a given bandwidth of frequency channel and these rates can easily be adapted for different applications that require flexible data rates. Flexible data rates and code lengths is a desire of 5G communication systems. For example, in conventional OFDM symbol with 64 subcarriers (M=64) and employing BSPK, only 64 bits can be conveyed. However, with CFCM the sequences can be in the order of several hundreds of words, meaning that the bits conveyed is given as $\log 2(Ms)=\log 2(\lfloor 2(M!+M) \rfloor)$, which is 296 bits, thus depicting an enormous advantage of 5 times the current technology. As a result, the conventional OFDM is a simplified case of CFCM, where no frequency bin is repeated within a length of an OFDM symbol. Furthermore, CFCM comes at an additional advantage of more reliable information with the lowest peak-to-average power ratio (PAPR).

Higher signal quality: Bit error rate from CFCM is very low. This enables communication at very low signal power and also, communication in quite noisy environment is made possible.

Lower low latency and power consumption with low peak-to-average power ratio (PAPR): The processing algorithm at the receiver only detects a single carrier frequency at a time, through known approaches of fast Fourier transforms (FFT). Therefore, the computational complexity is low in the order of the product of the logarithm of the signal length and some state-of-the-art channel coding methods may not have to be employed, unless higher order modulation is also employed. High PAPR, which is a problem with OFDM, is avoided as well.

Affordable low cost products: CFCM can eliminate the conventional highly complex soft-decision decoding, thus leading to simple hardware implementation of a root constellation diagram, which consist of negative and positive values only, in switching oscillators, and hence low cost.

Higher security system: The mapping table that describes how bits are mapped onto the codewords is shared between the sender and receiver at the start of communication or during configuration. As a result, any eavesdropper will not know the meaning of the taped messages.

Higher range of communications: the low power performance translates directly to the range between base station and the end-user terminal when considering the level of the minimum detectable signal (MDS).

Backward compatibility: frequency modulation systems already exist in many communication systems, and the addition of sequence information is easy to implement on existing systems and standards.

Therefore, firstly, what makes the present invention non-obvious and inventive is the fact that, unlike the state-of-the-art communication coding methods, input bit information is not transmitted to the receiver. What is transmitted to the receiver is the codeword of the frequency, port or antenna sequence as selected by the input bits, which conveys information.

As a result, the detector at the receiver is able to detect the received sequence and compare with the set of codeword sequence patterns in the sequence set in order to demap the estimated input bits. In fact the sequence patterns are made orthogonal to each other.

Since the codeword patterns can be designed in several unique ways, the probability of error in selecting the correct pattern diminishes with better frequency approximation methods. For example, beyond two frequency channels or bins, up to at least four bits can be conveyed to the receiver through sequence mapping.

Two main features are used to design the codeword in the set:

Firstly, map unique bits into the frequency tone sequence of a given length M i.e. sets of frequency tones, whose set is known but the transmitted tone sequence in the set is not known.

Secondly, detect the tone and its position in the sequence to demap the bits that are conveyed.

It is an aim of the invention notably to overcome the limits of the prior art in data transmission and channel coding, especially in improving data rates and easening implementation complexities and energy consumption.

According to one broad aspect of the present invention there is provided known source sequence codewords in a codeword set, which is used to convey information to the receiver in a communication system comprising: an input source to provide the information input bit stream that needs to be conveyed to the receiver; an encoder at the sender to produce colored source sequence codewords to be selected by the input bit stream and produce an encoder output stream to be transmitted to the receiver through a communications channel, where a colored source sequence codeword set is known a priori by both the sender and receiver. According to a colored codeword set mapping table; a detector at the receiver produces the estimates of the transmitted information, a comparator to compare the sequences computed for each codeword from the detected information and the known codewords and a de-mapper to read the random input bits from the sequence codeword that is similar to the detected information. Conventional symbol modulation mapping on each sub-carrier may be performed under Gunda rut coding. Different sequence structures that avoid interference may also be developed.

In some embodiments, coding and detecting of input data elements, comprising the steps of: implementing a set of frequency sequence codewords being unique in contents, wherein the input data is used to select a sequence codeword from the set of sequence codewords to be transmitted in a single or multiple-input system; where the codeword set are predetermined and are known at both the transmitter and the receiver, but the individual codewords in the set are not known to the receiver such that the sequences in each codeword produce different information.

In some embodiments, a method comprising a step of selecting from a mapping table a frequency, port or antenna sequence codeword according to the random input information data elements.

In some embodiments, each subcarrier is transmitted at a given time timeslot, according to the selected sequence order information contained in the selected codeword from the codeword set.

In some embodiments of the present invention, each subcarrier is transmitted after performing an inverse Fast Fourier transform (iFFT) transform, one subcarrier at a given time slot, where the selected subcarrier is orthogonal to the other unique subcarriers in the sequence.

In some embodiments, each subcarrier is transmitted after performing an iFFT transform, one subcarrier at a given time slot, where the selected subcarrier is orthogonal to the other unique subcarriers in the sequence, and the frequency of the subcarrier modulates the main signal carrier to the receiver.

In some embodiments, the length of the sequence of frequencies is known to both the transmitter and the receiver and higher order modulation may be mapped onto the sub-carriers to enhance data rates.

In some embodiments of the present invention, the said detection method comprises likelihood detection through the well-known threshold detection, hard-decision or soft decision algorithms; to produce estimated input data elements.

In some embodiments of the present invention, frequency detection algorithm like slow or fast Fourier transform (FFT) or simplified Goertzel algorithm is used for each subcarrier time slot and the detected frequency bin or estimated data elements stored into registers until the end of the known sequence length.

In some embodiments of the present invention, a comparator is used to compare the estimated data elements, individually with the already known sequence codewords in the codeword set.

In some embodiments of the present invention, the sequence codeword in the de-mapping table that resembles the estimated data elements is selected and the respective bits read out.

In some embodiments of the present invention, a de-mapping table at the receiver, which is similar to the mapping table at the sender, is used in reverse in order to freely read out the random input data elements represented by the said estimated sequence codeword.

In an aspect is a method for encoding, using a mapping table at a sender, an input bit 0 to a codeword type 1, where the codeword type 1 is a block containing a frequency vector of frequency 1 and frequency 2 and encoding an input bit 1 to a codeword type 2; where the codeword type 2 is a block containing a frequency vector of frequency 1 and frequency 2, but the position of frequency 1 and frequency 2 in the codeword type 1 is not the same as the position of frequency 1 and frequency 2 in the codeword type 2; and transmitting, decoding, comparing, de-mapping and deciding an estimated input bit 0 or an estimated input bit 1 at a receiver. In embodiments:

comprising a step of repeating transmission in each frequency of the encoded codeword through a channel between the sender and the receiver, where the total number of repetitions is known to both the sender and the receiver as a sequence length;

comprising a step of repeating transmission in each frequency of the encoded codeword through a channel between the sender and the receiver, where the number of repetitions is known to both the sender and the receiver and the frequencies in the sequence of the selected codeword type is transmitted one frequency at a time until all the frequencies in the selected codeword type have been transmitted to the receiver;

where the transmitted codewords are received as received signals at the receiver;

comprising a step of decoding, through a detector and Fourier transform, the received signals of claim 4 by detecting the frequency in the received signal; where only the frequency of the received signal with the highest power beyond a given threshold is decoded as a frequency 1 or a frequency 2 and the position of that decoded frequency 1 or frequency 2 in the received signals is recorded;

comprising a step of decoding, through a detector, the received signals of claim 4 by detecting the frequency in the received signal; where only the frequency of the received signal with the highest power beyond a given threshold is decoded as a frequency 1 or a frequency 2 and the position of that decoded frequency 1 or frequency 2 in the received signals is recorded; and this process is repeated for all number of repetitions in the sequence length;

comprising a step of comparing, through a comparator, the decoded frequency positions to the positions of frequencies in a known de-mapping table, and if the positions of the decoded frequencies is similar to positions of a similar frequencies in a codeword in the known de-mapping table, then that codeword in the known de-mapping table is selected as the estimated codeword type that was transmitted; and the estimated codeword types are recorded for all repetitions;

comprising a step of de-mapping, through a de-mapping table which is similar to the mapping table, by reading out bit 0 or bit 1 that corresponds to each of the recorded estimated codeword types; and all the bit 0 or bit 1 being read out for each estimated codeword type are recorded as output bit vector;

comprising a step of deciding an estimated input bit to be a bit 0 or a bit 1 similar to the output bit vector;

where the block containing the frequency vector, may contain a plurality of frequencies other than frequency 1 and frequency 2, and a plurality of bit 0 or plurality of bit 1 are assigned to these frequencies in the mapping table and the de-mapping table;

where the block containing the frequency vector, may contain a plurality of ports other than frequency 1 and frequency 2, and a plurality of bit 0 or plurality of bit 1 are assigned to these plurality of ports in the mapping table and the de-mapping table.

Sequence OFDM

This invention relates generally to enhancement of data rates and reduction of peak power values of signals in orthogonal frequency division multiplexing (OFDM) communication systems.

It is an aim of the invention notably to overcome the limits of the prior art in data transmission and channel coding, especially in improving data rates and easening reliability, implementation complexities and energy consumption.

According to one broad aspect of the present invention there is provided known orthogonal frequency sequence codewords in a codeword set, which is used to convey information to a receiver from a sender in a communication system comprising: an input source to provide information input bit stream that needs to be conveyed to the receiver; an encoder at the sender to produce colored orthogonal frequency sequence codewords to be selected by the input bit stream and produce an encoder output stream to be transmitted to the receiver through a communications channel, where a colored orthogonal frequency sequence codeword set is known a priori by both the sender and receiver. According to a colored codeword set mapping table; a detector at the receiver produces the estimates of the transmitted information, a comparator to compare the sequences for each codeword from the detected information and the known codewords and a de-mapper to read the random input bits from the sequence codeword that is similar to the detected sequence information. Conventional symbol modulation mapping on each sub-carrier may be performed under this invention. Different sequence structures that avoid interference may also be developed.

In some embodiments, coding and detecting of input data elements, comprising the steps of: implementing a set of orthogonal frequency sequence codewords being unique in contents, wherein the input data is used to select a sequence codeword from the set of sequence codewords to be transmitted in a single or multiple-input system; where the codeword set are predetermined and are known at both the transmitter and the receiver, but the individual codewords in the set are not known to the receiver such that the sequences in each codeword produce different information.

In some embodiments, a method comprising a step of selecting from a mapping table an orthogonally multiplexed frequency sequence codeword as sub-OFDM symbol according to the random input information data elements.

In some embodiments, each sub-OFDM symbol is transmitted at a given time timeslot, according to the selected sequence order information contained in the selected codeword from the codeword set.

In some embodiments of the present invention, each sub-OFDM symbol is transmitted after performing an inverse Fast Fourier transform (iFFT) transform, where the selected sub-OFDM symbol is orthogonally added and the sub-OFDM symbol is unique to all other sub-OFDM symbols in the sequence.

In some embodiments, each sub-OFDM symbol is transmitted after performing an iFFT transform, where the selected sub-OFDM symbol is orthogonal to the other unique sub-OFDM symbol in the sequence, and the frequencies of the sub-OFDM symbol modulates the main signal carrier to the receiver.

In some embodiments, the length of the sequence of symbols is known to both the transmitter and the receiver and higher order modulation may be mapped onto the sub-carriers to enhance data rates.

In some embodiments of the present invention, the said detection method comprises likelihood detection through the well-known threshold detection, hard-decision or soft decision algorithms; to produce estimated input bits or data elements.

In some embodiments of the present invention, frequency detection algorithm like slow or fast Fourier transform (FFT) or simplified Goertzel algorithm is used for each sub-OFDM symbol and the detected frequency bin or bins or estimated data elements stored into registers until the end of the known sequence length.

In some embodiments of the present invention, a comparator is used to compare the estimated data elements, individually with the already known sequence codewords in the codeword set.

In some embodiments of the present invention, the sequence codeword in de-mapping table that resembles the estimated data elements is selected as an estimated sequence codeword.

In some embodiments of the present invention, the de-mapping table at the receiver, which is similar to the mapping table at the sender, is used in reverse in order to freely read out the random input data elements represented by the said estimated sequence codeword.

In another discovery, an orthogonal bit pattern was recently discovered in colored codeword modulation of the patent application KE/P/2016/0002569 to convey information even in codewords consisting of orthogonal bit codeword. However, instead of improving data rates, bit sequences are vital in increasing reliability in low energy systems with very simple implementation complexities.

The other good FM application that improves data rates is known as colored sequence codeword modulation (CSCM). Furthermore in CSCM, when the sequences are frequency carriers or groups of them, CSCM is known as CFCM, where single carrier frequency sequences are used to improve data rates in the order of $\log_2 \lfloor (M_s) \rfloor$, where $M_s=2(M!+M)$ is the number of possible sequences and M is the length of a single sequence of single-carriers. A further data rate is improved from a frequency group domain. However, CFCM involves single carrier systems or single ports or single groups of them and may not be well suited in interference environments.

The present invention provides inventive method and steps for increasing data rates and lowering PAPR and interference at a receiver through mapping and detection of OFDM frequency (tone) sequences as a source of information. This is different from groups of frequency since OFDM involves the use of FFT and inverse FFT (IFFT) of multiple carriers. Therefore, this invention provides additional data rates in OFDM systems.

The COFCM paradigm does not necessarily include conventional higher order modulation per sub-carrier in order to present higher data rates at the receiver that are equal to or more than that of conventional OFDM.

Firstly, data rates in the proposed modulation are increased by mapping the input bits to the transmitted sub-OFDM symbol sequence. As a result, the sequence carries information and the transmitted sequence is not known at the receiver. Furthermore, the sequences are detected by detecting each frequency in a sub-OFDM symbol and also the group from which the subcarriers belong.

Secondly, PAPR is highly reduced since the conventional OFDM symbol is transmitted in a sub-symbol by sub-symbol fashion.

Thirdly, even more data rates are added to the OFDM constellation by mapping different sequences to the sub-OFDM symbols.

Indeed, a system is required to solve the problems of the prior art. The following are some of the advantages of COFCM;

Extremely high and flexible data rates: COFCM is designed such that it provides a large number of symbols per second in a given bandwidth of frequency channel and these rates can easily be adapted for different applications that require flexible data rates. Flexible data rates and code lengths is a desire of 5G communication systems. For example, in conventional OFDM symbol with 64 subcarriers (M=64) and employing BSPK, only 64 bits can be conveyed. However, with COFCM the sequences can be divided into groups of 16 OFDM subcarriers that form an OFDM sub-symbol that consists of 4 sub-carriers. The sequences are then given as 2(M!+M), M=16, meaning that the bits conveyed is given as $\log_2(\lfloor M_s \rfloor)=\log_2(\lfloor 2(M!+M) \rfloor)$, which is 45 additional bits to the conventional OFDM symbol.

Furthermore, with well devised mapping table for the frequency sequences in the sub-OFDM symbols, upto at least 104 additional bits will be conveyed to the receiver compared to 64 bits in BPSK OFDM.

As a result, the conventional OFDM is a simplified case of COFCM, where all sub-symbols are transmitted within an OFDM symbol. Furthermore, COFCM comes at an additional advantage of more reliable information.

Higher signal quality: Bit error rate from COFCM is very low due to frequency based equalization. This enables communication at very low signal power and also, communication in quite noisy environment is made possible.

Lower low latency and power consumption with low peak-to-average power ratio (PAPR): The processing algorithm at the receiver only detects a single carrier frequency at a time. Therefore, the computational complexity is low in the order of the product of the logarithm of the signal length and some state-of-the-art channel coding methods may not have to be employed, unless higher order modulation is also employed. High PAPR, which is a problem with OFDM, is much reduced as well.

Affordable low cost products: COFCM can eliminate the conventional highly complex soft-decision decoding, thus leading to simple hardware implementation of the root constellation diagram only, in switching oscillators, and hence low cost.

Higher security system: The mapping table that describes how bits are mapped onto the codewords is shared between the sender and receiver at the start of communication or during configuration. As a result, any eavesdropper will not know the meaning of the taped messages.

Higher range of communications: the low power performance translates directly to the range between base station and the end-user terminal when considering the level of the minimum detectable signal (MDS).

Backward compatibility: orthogonal frequency modulation systems already exist in many communication systems, and the addition of sequence information is easy to implement on existing systems and standards.

Therefore, firstly, what makes the present invention non-obvious and inventive is the fact that, unlike the state-of-the-art communication coding methods, input bit information is not transmitted to the receiver. What is transmitted to the receiver is the codeword of the frequency sequence as selected by the input bits, which conveys information. As a result, the detector at the receiver is able to detect the received sequence and compare with the set of codeword sequence patterns in the sequence set in order to demap the estimated input bits.

Since the codeword patterns can be designed in several unique ways, the probability of error in selecting the correct pattern diminishes with better frequency approximation methods. For example, beyond two frequency channels or bins, up to at least four bits can be conveyed to the receiver through sequence mapping.

Two main features are used to design the codeword in the set: Firstly, map unique bits into the frequency tone sequence of a given length M i.e. sets of frequency tones, whose set is known but the transmitted tone sequence in the set is not known. Secondly, detect the tone and its position in the sequence to demap the bits that are conveyed.

In an aspect is a method for encoding, using a mapping table at a sender, an input bit 0 to a codeword type 1, where the codeword type 1 is a block containing a frequency vector of frequency 1 and frequency 2 and encoding an input bit 1 to a codeword type 2; where the codeword type 2 is a block containing a frequency vector of frequency 1 and frequency 2, but the position of frequency 1 and frequency 2 in the codeword type 1 is not the same as the position of frequency 1 and frequency 2 in the codeword type 2; and transmitting, decoding, comparing, de-mapping and deciding an estimated input bit 0 or an estimated input bit 1 at a receiver. In embodiments:

comprising a step of forming a sub-OFDM symbol from the encoded codeword type 1 and codeword type 2, through known inverse Fourier transform algorithm;

comprising a step of transmission of each sub-OFDM symbol through a channel between the sender and the receiver, where the total number of transmissions is known to both the sender and the receiver as a sequence length;

comprising a step of transmission of each sub-OFDM symbol through a channel between the sender and the receiver, where the total number of transmissions is known to both the sender and the receiver as a sequence length;

where the transmitted sub-OFDM symbols are received as received signals at the receiver;

comprising a step of decoding, through a detector and Fourier transform, the received signals of claim 5 by detecting the frequencies in the received signal; where only the frequency of the received signal with the highest power beyond a given threshold is decoded as a frequency 1 or a frequency 2 and a position or positions of that decoded frequency 1 or frequency 2 in the received signals is recorded;

where only the frequency of the received signal with the highest power beyond a given threshold is decoded as a frequency 1 or a frequency 2 and a position or positions of that decoded frequency 1 or frequency 2 in the received signals is recorded; and this process is until the in the sequence length;

comprising a step of comparing, through a comparator, the decoded frequency positions to the positions of frequencies in a known de-mapping table, and if the positions of the decoded frequencies is similar to positions of a similar frequencies in a codeword in the known de-mapping table, then that codeword in the known de-mapping table is selected as the estimated codeword type that was transmitted; and the estimated codeword types are recorded for the sequence length;

comprising a step of de-mapping, through a de-mapping table which is similar to the mapping table, by reading out bit 0 or bit 1 that corresponds to each of the recorded estimated codeword types; and all the bit 0 or bit 1 being read out for each estimated codeword type are recorded as output bit vector;

comprising a step of deciding an estimated input bit to be a bit 0 or a bit 1 similar to the output bit vector;

where the block containing the frequency vector, may contain a plurality of frequencies other than frequency 1 and frequency 2, and a plurality of bit 0 or plurality of bit 1 are assigned to these frequencies in the mapping table and the de-mapping table.

In an aspect is a method for encoding, the method comprising: (a) determining from a mapping table a codeword corresponding to a first bit from a string of bits, the mapping table comprising a codeword of type 1 and a codeword of type 2, wherein the codeword of type 1 and the codeword of type 2 are orthogonal bit vectors, wherein the length of the codeword of type 1 and the length of the codeword of type 2 are equal integers greater than 1; (b) sending the codeword corresponding to the first bit to a port; and (c) repeating steps (a) and (b) for each subsequent bit from the string of bits. In embodiments:

further comprising transmitting the codeword corresponding to the first bit from the port via a wireless or physical medium;

further comprising receiving, by a receiver, the transmitted codeword corresponding to the first bit;

further comprising comparing, by the receiver, the received codeword corresponding to the first bit to the mapping table to determine the identity of the first bit from the string of bits;

further comprising identifying, by the receiver, a single bit and corresponding bit position from the received codeword, and estimating the identity of the received codeword based on the single bit and bit corresponding position;

further comprising identifying, by the receiver, a total number of bits of type 0 or type 1 within the received codeword, and estimating the identity of the received codeword based on the total number of bits of type 0 or type 1;

comprising deciding an estimated input bit to be a bit 0 or a bit 1 if a majority of the bits in the codeword is a bit 0 or a bit 1;

further comprising selection decoding by the receiver, the selection decoding comprising detecting one bit from the codeword at a time, where only a received signal with the highest power is decoded as a bit 1 or a bit 0 and the position of that decoded bit in the received signal is recorded as a decoded bit position;

wherein the method generates a set of codewords, each codeword in the set of codewords corresponding to a bit in the string of bits, and wherein the method comprises sending the set of codewords to the port;

wherein the length of the codeword of type 1 and the length of the codeword of type 2 are equal integers in the range of 2-6;

further comprising transmitting the codeword corresponding to the first bit from the port via a wireless or physical medium a predetermined number of times, wherein the transmitting comprises transmitting the predetermined number of times such that a receiver will know the predetermined number of times.

In an embodiment is a method for encoding, the method comprising: generating a set of codewords from an input string of bits by determining, from a mapping table, a corresponding codeword for each bit from the input string of bits, wherein the mapping table comprising a codeword of type 1 and a codeword of type 2, wherein the length of the codeword of type 1 and the length of the codeword of type 2 are equal integers greater than 1; formatting the set of codewords for transmission by a medium; and sending the formatted set of codewords to a port. In embodiments, the method further comprise transmitting the set of codewords from the port via a wireless or physical medium; receiving, by a receiver, the transmitted set of codewords; comparing, by the receiver, the received set of codeword to the mapping table to determine the identity of the bits in the string of bits.

In an aspect, is a method for encoding communications, the method comprising: receiving an electromagnetic communication signal, wherein the communication signal is an electromagnetic signal or an electronic signal including embedded digital information, wherein the digital information is a codeword comprising at least two bits and is selected from a mapping table based on an input bit from an input string of bits; extracting the at least two bits of the codeword; and determining the input bit by comparing the extracted at least two bits of the codeword to the mapping table. In an embodiment, the method comprises repeating the receiving, extracting, and determining for a plurality of codewords corresponding to a plurality of bits in an input string of bits.

In an aspect is a method for encoding, the method comprising: (a) determining from a mapping table a codeword corresponding to a first bit from a string of bits, the mapping table comprising a codeword of type 1 and a codeword of type 2, wherein the codeword of type 1 and the codeword of type 2 are orthogonal bit vectors of length n such that the codeword corresponding to the first bit from a string of bits is a bit vector of length n; (b) sending each bit from the codeword corresponding to the first bit to a separate port in an array of at least n ports; and (c) repeating steps (a) and (b) for each subsequent bit from the string of bits. In embodiments:

wherein each port in the array of at least n ports that receives a bit is configured to transmit the received bit, and wherein the transmitting by the array of ports is configured for Time Division Multiplexing;

wherein each port in the array of at least n ports that receives a bit is configured to transmit the received bit, and wherein the n ports transmit in a predetermined sequence;

further comprising transmitting the codeword corresponding to the first bit from the array of at least n ports via a wireless or physical medium;

further comprising receiving, by a receiver, the transmitted codeword corresponding to the first bit;

further comprising comparing, by the receiver, the received codeword corresponding to the first bit to the mapping table to determine the identity of the first bit from the string of bits;

wherein each port in the array of at least n ports that receives a bit is configured to transmit the received bit, and wherein the transmitting by the array of ports is configured for Time Division Multiplexing, and further comprising transmitting the codeword corresponding to the first bit from the array of at least n ports via a wireless or physical medium;

wherein each port in the array of at least n ports that receives a bit is configured to transmit the received bit, and wherein the transmitting by the array of ports is configured for Time Division Multiplexing, and further comprising transmitting the codeword corresponding to the first bit from the array of at least n ports via a wireless or physical medium, and further comprising receiving, by a receiver, the transmitted codeword corresponding to the first bit, and further comprising comparing, by the receiver, the received codeword corresponding to the first bit to the mapping table to determine the identity of the first bit from the string of bits.

In an aspect is a method for encoding, the method comprising: (a) generating a set of codewords from an input string of bits by determining, from a mapping table, a corresponding codeword for each bit from the input string of bits, wherein the mapping table comprising a codeword of type 1 and a codeword of type 2, wherein the codeword of type 1 and the codeword of type 2 are orthogonal bit vectors of length n; (b) formatting the set of codewords for transmission by a medium; and (c) sending the formatted set of codewords to an array of at least n ports such that, for each codeword from the set of codewords, each bit in the codeword is sent to a separate port. In embodiments:

wherein the at least n ports are interlinked and configured such that they transmit according to a Time Division Multiplexing scheme;

wherein the at least n ports are interlinked and configured such that they transmit according to a predetermined sequence.

In an aspect is a method for encoding communications, the method comprising: receiving an electromagnetic communication signal, wherein the communication signal is an electromagnetic signal or an electronic signal including embedded digital information, wherein the digital information is a codeword comprising n bits, wherein n is at least two, and the codeword is selected from a mapping table based on an input bit from an input string of bits, and wherein the n bits of the codeword have been transmitted via n transmit antenna connected to n ports on a transmitter; extracting the n bits of the codeword; and determining the input bit by comparing the extracted n bits of the codeword to the mapping table. In embodiments:

wherein the digital information comprises a set of codewords, each codeword containing n bits transmitted via n transmit antenna connected to n ports on a transmitter, and wherein the method further comprises: extracting n bits for each codeword in the set of codewords; and determining a string of input bits by comparing the extracted n bits for each codeword in the set of codewords to the mapping table;

wherein the electromagnetic communication signal comprises variable signal strengths, and where the method further comprises isolating a relatively strongest signal strength and determining the embedded digital information from the relatively strongest signal strength;

further comprising decoding, through a detector, the received electromagnetic communication signal by detecting a minimum noise signal formed from two orthogonal codewords of type 1 and type 2; where only the noise signal with the smallest absolute value is detected as a codeword type 1 or type 2.

In an aspect is a method for encoding, the method comprising: (a) generating, from a mapping table, a codeword corresponding to a bit from an input string of bits, wherein the mapping table comprises a codeword of type 1 and a codeword of type 2, wherein the codeword of type 1 is a vector containing n elements in a predetermined order and the codeword of type 2 is a vector containing n elements in a predetermined order, and wherein the element in each position in the codeword of type 1 is different from the element in the corresponding position in the codeword of type 2; (b) formatting the codeword for transmission by a medium; and (c) sending the formatted codeword to a port. In embodiments:

wherein the elements are selected from frequencies and ports;

further comprising transmitting the formatted codeword via a medium such that the predetermined order of the elements forming the codeword is maintained during the transmission;

further comprising receiving the n elements of the codeword and maintaining, at the receiver, the transmitted order of the n elements;

further comprising decoding the codeword by comparing the received formatted codeword to the mapping table;

comprising repeating steps (a)-(c) for each bit in the input string of bits.

In an aspect is a method for encoding, the method comprising: (a) generating, from a mapping table, a codeword corresponding to a bit from an input string of bits, wherein the codeword is a frequency vector containing n frequencies in a predetermined order, (b) sending the codeword corresponding to the bit from an input string of bits to a port, wherein the mapping table comprises a codeword of type 1 containing n frequencies and a codeword of type 2 containing n frequencies, and the frequency in each position in the codeword of type 1 is different from the frequency in the corresponding position in the codeword of type 2. In embodiments:

comprising repeating transmission in each frequency of the codeword through a channel between a sender and a receiver, where the number of repetitions is known to both the sender and the receiver and the frequencies in the sequence of the codeword is transmitted one frequency at a time until all the frequencies in the codeword have been transmitted to the receiver;

further comprising formatting the codeword by applying an inverse Fourier Transform (IFT) function prior to transmission;

wherein the n frequencies in the codeword of type 1 and the n frequencies in the codeword of type 2 are selected from two or three different frequencies.

In an aspect is a method for encoding communications, the method comprising: receiving an electromagnetic communication signal, wherein the communication signal is an electromagnetic signal or an electronic signal including embedded information, wherein the embedded information is a codeword comprising n elements, wherein n is at least two, and the codeword is selected from a mapping table and represents an input bit from an input string of bits, and wherein the n elements of the codeword are assigned a discrete transmission time slot in a prearranged sequence; extracting the n elements of the codeword; and determining the input bit by comparing the extracted n elements of the codeword to the mapping table. In embodiments:

wherein the elements are frequencies or ports;

wherein the extracting comprises applying a FT function to the received electromagnetic communication signal;

wherein the extracting comprises applying a FT function to the received electromagnetic communication signal, where only the frequency with the highest power beyond a predetermined threshold is decoded as a frequency 1 or a frequency 2 and the position of that decoded frequency 1 or frequency 2 in the received signal is recorded;

wherein the embedded information comprises a plurality of codewords, and wherein the method comprises repeating the extracting for each codeword.

In an aspect is a method for orthogonal frequency division multiplexing (OFDM) communications, the method comprising: receiving an electromagnetic OFDM communication signal, wherein the OFDM communication signal is an electromagnetic signal or an electronic signal including embedded digital information, wherein the digital information comprises a bit from an input string of bits and is encoded by selecting, from a mapping table, an ordered set of frequencies corresponding to the bit from the input string of bits, and applying an inverse FT function to the ordered set of frequencies; extracting the ordered set of frequencies from the OFDM communication signal by applying a FT function; and determining the bit from the input string of bits by comparing the extracted ordered set of frequencies to the mapping table. In embodiments:

wherein the ordered set of frequencies comprises at least three frequencies that may be the same or different and are independently selected from a group consisting of at least two unique frequencies;

wherein the inverse FT function is used to form a sub-OFDM symbol from the ordered set of frequencies;

wherein the ordered set of frequencies forms a codeword representing the bit from the input string of bits, and wherein the digital information comprises a set of codewords representing the input string of bits;

wherein the inverse FT function is used to form a sub-OFDM symbol from the ordered set of frequencies, and the method further comprises receiving a plurality of sub-OFDM symbols, where the total number of sub-OFDM symbols is known to both a sender and a receiver as a sequence length;

wherein determining the bit from the input string of bits comprises estimating the ordered set of frequencies and comparing the estimated ordered set of frequencies to the mapping table.

In an aspect is a method for encoding, the method comprising: (a) generating, from a mapping table, a codeword corresponding to a bit from an input string of bits, wherein the mapping table comprises a plurality of codeword types, each codeword type in the mapping table comprising a unique sequence of n orthogonal frequencies; (b) formatting the codeword for transmission by a medium by applying an inverse Fourier Transform function on the codeword; (c) sending the formatted codeword to a port. In embodiments:

further comprising transmitting via a medium the formatted codeword for receipt by a receiver;

further comprising receiving, by a receiver, the formatted codeword and applying a Fourier Transform function on the formatted codeword to recover a sequence of n orthogonal frequencies corresponding in a mapping table to the bit from the input string of bits.

In an aspect is a method for communicating information, comprising: (a) using a mapping table at a sender, encoding an input bit 0 to a codeword type 1 and an input bit 1 to a codeword type 2, wherein the codeword type 1 is a block containing a frequency vector of frequency 1 and frequency 2, and where the codeword type 2 is a block containing a frequency vector of frequency 1 and frequency 2, but the position of frequency 1 and frequency 2 in the codeword type 1 is not the same as the position of frequency 1 and frequency 2 in the codeword type 2; (b) forming a sub-OFDM symbol from the encoded codeword type 1 and codeword type 2, through an inverse Fourier transform algorithm; and (c) transmitting the sub-OFDM symbol through a channel between a sender and a receiver, where the total number of transmissions is known to both the sender and the receiver as a sequence length. In embodiments:

the transmitted sub-OFDM symbols are received as received signals at the receiver;

further comprising: decoding, through a detector and Fourier transform, the received signals by detecting the frequencies in the received signal, wherein only the frequency of the received signal with the highest power beyond a given threshold is decoded as a frequency 1 or a frequency 2 and a position or positions of that decoded frequency 1 or frequency 2 in the received signals is recorded; and repeating the decoding for all sub-OFDM symbols in the received signal;

further comprising comparing, via a comparator module, the decoded frequency positions to the positions of frequencies in the mapping table, and recording an estimated codeword if the positions of the decoded frequencies are similar to positions of similar frequencies in a codeword in the mapping table;

further comprising de-mapping, with the mapping table, the sub-OFDM symbol by reading out bit 0 or bit 1 that corresponds to each of the recorded estimated codeword types;

wherein the mapping table may contain a plurality of frequencies other than frequency 1 and frequency 2, and a plurality of bit 0 or plurality of bit 1 are assigned to these frequencies in the mapping table.

These and other features, objects and advantages of the present invention will be readily apparent to those reading the entirety of this disclosure, which includes the accompanying drawings and claims.

BRIEF DESCRIPTION OF THE DRAWINGS

The invention will be explained in more detail in the following text using one exemplary embodiment and with reference to the drawings.

DETAILED DESCRIPTION OF EMBODIMENTS

Figure 1:
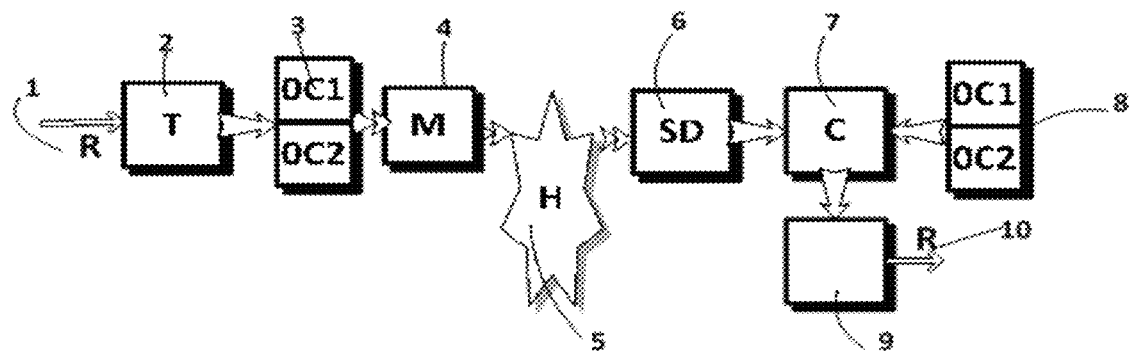
FIG. 1 Shows a block diagram illustrating a communications system with colored codeword modulation.

Throughout this disclosure, there is discussion of electromagnetic signals transmitted through a medium. Suitable mediums include, for example, air and vacuum (e.g., for radio signal propagation and the like) as well as channeled mediums such as metal wires, fiber optic cabling, or the like. Transmitting is understood in the normal sense, to include any necessary formatting steps in order to transmit a signal via an intended medium. Such steps include electromagnetic signal modulation, filtering, amplifying, and the like.

Various methods of transmission and receipt of encoded information (i.e., digital information encoded on an electromagnetic signal) are described herein, and the skilled artisan will appreciate that a variety of transmitting and receiving devices may be used to carry out such methods. Such devices may be dual purpose (e.g., transceivers) or single purpose devices, and may include computer processors or may be entirely analog devices, as appropriate and desired. Transmitting and receiving devices may include any necessary components for their operation, including I/O components suitable for operation and control by a user. Colored Codewords The present invention relies on novel concepts of communication, in which an input transmitter bit information is a known codeword set, which is desirable in storage, energy-saving, secure, deep space, and mobile, optical and fixed communications industries.

The features of colored-bit codeword modulation (CBCM) achieve reliable communication because the hamming distance between the bits in the codewords is expanded. In terms of power consumption and complexity, it is possible to decode a single bit position in order to determine the whole codeword, thus saving on power and SD requires minimal signal processing algorithms. Therefore, low-power modules and devices can be used in industrial applications that require long term power needs and accessibility to power is a problem e.g. military operation in remote areas, storage devices, noisy hardware, wireless and cable network, optical and deep space communication industries.

Furthermore, colored-bit codeword modulation coding presents a novel result in secret communications because many keys could be transmitted in the noisy channel. Therefore, it is not possible to decode the message even when the eavesdropper has information about the various colors or codewords. The eavesdropper can only generate a set of erroneous keys. This is desirable in military operations and general communications industry.

In addition, short codeword lengths can be used to relay information, thus improving latency limits of next generation communication systems like automation in control systems. The next generation network (NGN) is desired to have a low latency of 1 millisecond (ms), which is possible with the present invention for some network sizes.

The advantages can be summarized as follows: Soft input soft output (SISO) decision encoders and decoders are not compulsory; Electronic requirements on SISO coders are less; Decoding after short code length and flexible code rates; Communication is possible even in noisy environment; Secret communication is enhanced since only known message is transmitted and the key is not passed through the channel; More robust equipment which occupies less space and less implementation complexity; Interleaving is not mandatory, a simple repeat is satisfying; Low latency networks; Longer battery life due to low power consumption; Spectrum enhancement: Communicating on the same frequency at different power levels is possible; Codeword length is not a multiple of two; Applicable in non-orthogonal multiple access (NOMA) for low power signals; Not limited by error-floor.

However, it is clear that the features of the proposed colored codeword coding can be implemented independently, including increasing data rates through multiple-input multiple-output systems, non- and systematic coding, non-log-likelihood decoding and mapping or de-mapping tables, and use of information other than bits without going beyond the scope of the present invention.

The following give the meaning of the letters in FIG. 1. (R) in (1) refers to random input information bits at a sender to be conveyed to a receive detector (SD). (T) in (2) refers to a mapping table for selecting a codeword to be transmitted to the receive detector (SD), where a bit 0 selects a different codeword (OC1) from the codeword and (OC2) selected by a bit 1 in (3). The selected codeword is transmitted to the receiver on a single frequency carrier after conventional symbol modulation in apparatus (M) in (4). These apparatus (2), (3) and (4) form the transmitter. (H) which is found in (5) refers to the channel between the sender and a receiver, while (SD) in (6) refers to the selection detector at a receiver that detects the transmitted codeword from a received signal that has the highest signal power through hard detection process. The position of the detected bit is then compared to the bits (OC1) and (OC2) in (8), through the comparator (C) in (7). A codeword is selected that corresponds to that of the detected bit and all codewords are recorded for all repetitions. These selected codewords are then used in a de-mapping table (T) in (9) in order to read out the corresponding bit 0 or bit 1. Majority logic is then used to decide on the estimated input (R) in (10) as bit 0 or bit 1.

The transmission process may be preceded with the well-known modulation methods.

TABLE I

| Bits | Codeword |
|---|---|
| 0 | (101) |
| 1 | (010) |

Table I illustrates an example of a mapping table for one bit in a codeword of 3 bits, which is the same as the de-mapping table and the code rate is given as rate=1/3. It is evident from Table I that the position of bit 1 and bit 0 in the codeword is different. In colored bit codeword modulation, the codes are identified as C ($n_b$, $n_r$), where $n_b$ refers to the number of bits in a colored codeword, while $n_r$ refers to the number of repetitions after the transmission of a codeword. Therefore, the detection of a single bit leads to a selection decoding of all the bits in the codeword.

TABLE II

| Bits | Repeat Sequence |
|---|---|
| 0 | (101), (101), (101) |
| 1 | (010), (010), (010) |

Table II represents colored bit codeword modulation for a code rate of rate=1/9. The colored code is denoted as C (3, 2), denoting three sequence bit members.

Table III represents colored bit codeword modulation for a code rate of rate=3/9. The colored code is denoted as C (3, 2), denoting three sequence members. This code maps three bits for every codeword repeated three times, which means the performance should be the same as a rate=1/3 code. However, it will be shown in FIG. 3 that is possible only when selection decoding is employed.

TABLE III

| Bits | Repeat Sequence |
|---|---|
| 000 | (101), (101), (101) |
| 001 | (101), (101), (010) |
| 010 | (101), (010), (101) |
| 011 | (101), (010), (010) |
| 100 | (010), (101), (101) |
| 101 | (010), (101), (010) |
| 110 | (010), (010), (101) |
| 111 | (010), (010), (010) |

In a mathematical form, the received signal vector r of the codeword in additive white Gaussian noise n is written in (a) as $$r = hx + n \quad (a)$$

where h represents the channel gain between the sender and the receiver and x is the modulated symbol, where the set x=[0 1 0] is mapped onto x=[-1 1 -1] and u=[1 0 1] is mapped onto x=[1 -1 1]. For the AWGN channel, the channel gain vector is given as h=[1 1 1], while for the Rayleigh channel, h is a random vector consisting of complex values, which are identically and independently distributed (i.i.d.) with uniform phase distribution.

The detector acts on r, by deciding the value of each element of r to be a 1 if the amplitude is beyond the value zero (0) or a -1 if the amplitude is below the value zero (0). This process is simple and is known as hard-decision detection.

Selection decoding works by decoding only the element of r that has the highest power thus saving on extra processing steps.

Figure 2:
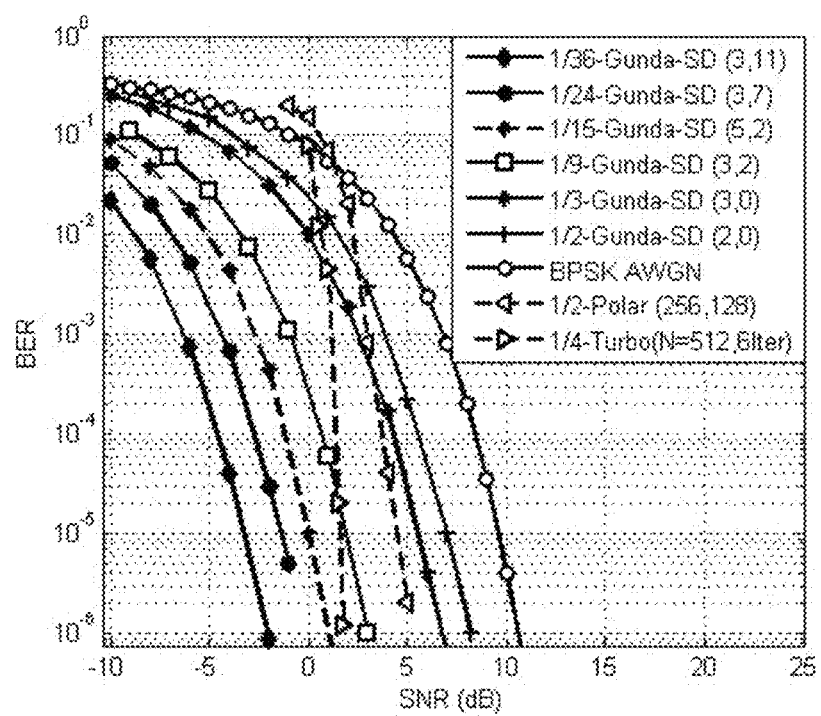
FIG. 2 Shows the first results of detection bit error rates (BER) achieved through additive white Gaussian channels.

FIG. 2 shows the first results of detection bit error rates achieved through additive white Gaussian channels. A half rate code denoted as 1/2-Gunda-SD(2,0) is noted to possess better error efficiency than the binary phase shift keying (BPSK) results at rate one (denoted as R=1). Similarly, results from the systems R=1/3-Gunda-SD (3, 0), R=1/9-Gunda-SD (3,2) and R=1/15-Gunda-SD(5,2) until R=1/36-Gunda-SD(3,11) all show the increase in error efficiency as the code rate reduces. A further comparison is given for the state-of-the-art channel codes that depend on soft information i.e. R=1/4 Turbo employing code length of L=512 with 6 iterations and R=1/2 Polar codes employing code length of L=256. It is evident that the reliability grows as the code rate reduces, but reliability is a desired element in noisy environments that excess data rates.

Figure 3:
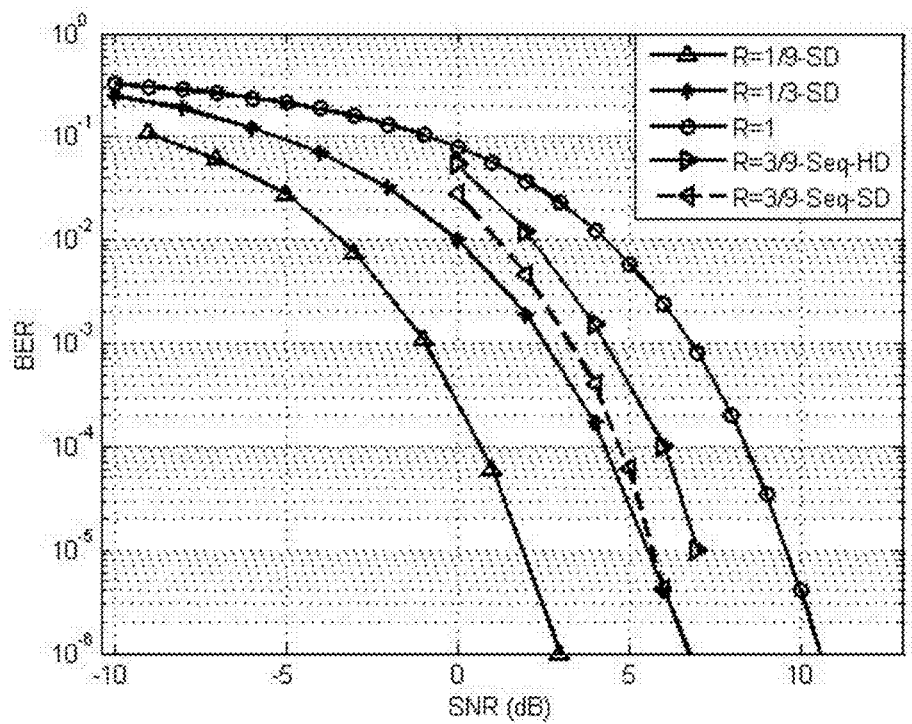
FIG. 3 Shows the second results of detection bit error rates (BER) achieved through additive white Gaussian channels.

FIG. 3 shows the second results of detection bit error rates achieved through additive white Gaussian channels, with the mapping of Table III. It is important to note that, when three bits are de-mapped at the same time as rate=3/9, only selection decoding method leads to error efficiency that is similar to the code rate=1/3 system. The conventional hard-decision system fails to achieve equal error efficiency.

Figure 4:
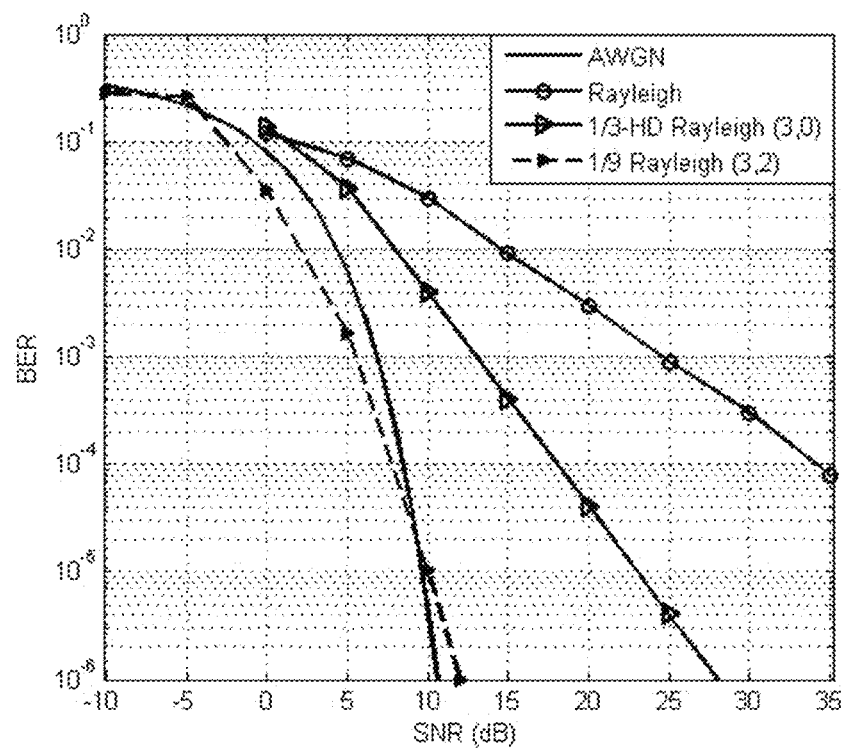
FIG. 4 Shows the third results of detection bit error rates (BER) achieved through flat Rayleigh fading channels.

FIG. 4 shows the error rates achieved through Rayleigh channels through hard-detection algorithm of a codeword of three bits without repeat (1/3-HDD Rayleigh) and one of 3-bit system repeated twice to form (1/9 Rayleigh (3,2)) code. It is important to note that the present invention provides error rates of the rate=1/9 in a Rayleigh channel that are similar to a BPSK in additive white Gaussian noise (AWGN). However, for Rayleigh channels, hard-decision is applied to all received signals and majority logic used for all bits without the SD algorithm.

Generally, in the selection decoding method, only the received signal with the maximum real value is decoded in order to determine the transmitted codeword. For example, the mapping table where the codeword of color (101) represents the input bit 0 and where the orthogonal co-set codeword of color (010) represents the input bit 1. In the three bit transmission, if the second signal is the maximum, which is decoded to be a 1 (positive amplitude), then the codeword is selected to be (010), which is de-mapped as an input bit 1. The same procedure is repeated for all repetitions.

Schemes like those in the international patent application PCT/IB2016/053818 can be used to synthesize more signals at the receiver, which can be used to obtain low error rates with fewer repetitions.

Antenna Diversity

The present invention relies on novel concepts of communication, in which input bit information is used to select a known codeword set, which in turn selects the symbols to be transmitted by a plurality of antennas. The present invention is desirable for better signal reliability in applications such as military where the right and secure information is required in a very noisy environment, even if it takes a second to receive it.

Also, in the power of the receive devices is expected to last longer and minimal signal processing algorithms like those provided by the present invention are necessary. Also applications such as storage, energy-saving, secure, deep space, and mobile, optical and fixed communications industries will find the proposed method to be vital.

Figure 5:
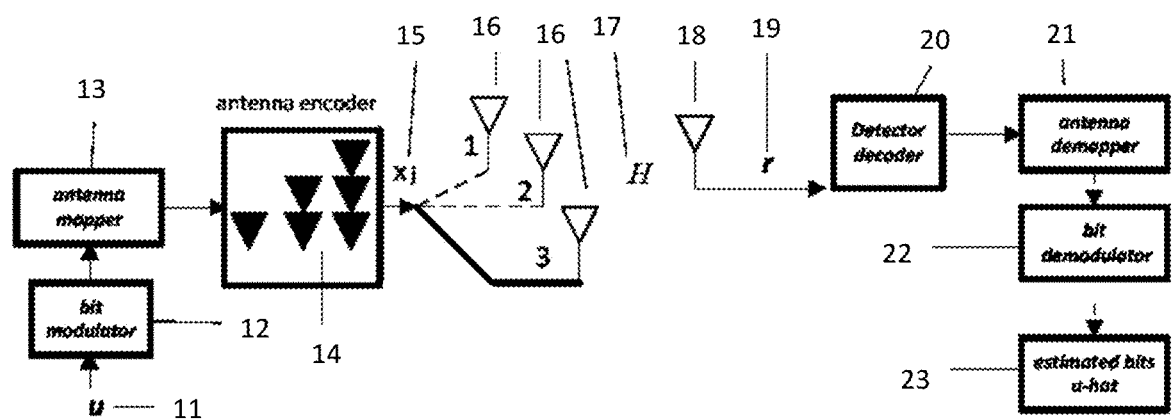
FIG. 5 shows a block diagram illustrating a communications system with transmit antenna modulation.

The following give the meaning of the letters in FIG. 5. (U) in (11) refers to random input information bits in terms of bit 0 and bit 1, which are to be conveyed to a receiver. (12) refers to a bit modulator, which transforms the bit 1 into a modulated symbol x=1 and transforms the bit 0 into a modulated symbol x=-1. Then (13) refers to an antenna mapper which has a mapping table that assigns different symbols to different antennas, in an orthogonal fashion as expressed in a mapping table in Table I. An antenna encoder (14) is used to decide the total number of transmitting antennas for a particular scheme. There will be no diversity for a single antenna, diversity order two for two antennas and diversity order three for three antennas. Mapped symbol $x_j$ (15) represents the selected symbol x of each antenna j. The mapped transmit antennas (16) are then used to transmit their symbols to receive antenna (18) through a channel (17). The receive antenna then samples the received signal (r) in (19) which is recorded in detector decoder (20). The detector decoder (20) then determines the minimum noise for the two codewords from the received signal (r). The (20) applies the formulae in equations (6-8) to determine the modulated codeword that gives the minimum noise. The modulated codeword is then used in the antenna demapper (21) to determine the symbols assigned to each transmit antenna, and these symbols are then relayed to a bit demodulator (22) that transforms the bits back to bit 0 or bit 1 and a de-mapping table in the bit demodulator is used to determine the estimated bits, u_hat (23).

In addition, the de-mapping operation may be performed directly from antenna demodulator according to Table IV.

The same method and steps are used for all repetitions and the estimated bit forms the majority over all the repetitions is selected as a final estimated bit.

TABLE IV

| Bits | Codeword | Modulated codeword | Antenna and symbols |
| --- | --- | --- | --- |
| 0 | (101) | (1-11) | ([a1, 1] [a2, -1], [a3, 1]) |
| 1 | (010) | (-11-1) | ([a1, -1] [a2, 1], [a3, -1]) |

More explicitly from Table IV, encoding in transmit antenna diversity modulation is performed as follows. Let there be three antennas to be used for transmission. Whenever the input bit 1 is to be transmitted, then antenna a1 and antenna a3 will transmit modulated symbol x=-1, while antenna a2 will transmit modulated symbol x=1. On the other hand, whenever the input bit 0 is to be transmitted, then antenna a1 and antenna a3 will transmit modulated symbol x=1, while antenna a2 will transmit modulated symbol x=-1. For two antennas, only the first two bits of the codewords are used.

In a mathematical form, the received signal vector r of the codeword from $n_t$ transmit antennas in additive white Gaussian noise n is written in (1) as $$r = \frac{1}{\sqrt{n_t}} \sum_{j=1}^{n_t} h_j x_j + n \quad (1)$$

where h represents the channel gain between the sender and the receiver and x is the modulated symbol, where the set x=[0 1 0] is mapped onto x=[-1 1 -1] and u=[1 0 1] is mapped onto x=[1 -1 1].

For flat fading Rayleigh channel, h is a random vector consisting of complex values, which are identically and independently distributed (i.i.d.) with uniform phase distribution.

In the case that $n_t$=3, the expression in (1) can be written in (2) as, $$r = \frac{1}{\sqrt{n_t}}(h_1 x_1 + h_2 x_2 + h_3 x_3) + n \quad (2)$$

But since $x_1 = x_3$, (=$-x_2$) in the codeword, we have in (3)

$$r = \frac{1}{\sqrt{n_t}}\{(h_1 + h_3)x_1 + h_2 x_2\} + n \quad (3)$$

In the simplest case, when x∈(-1,1) and the mapping of bit 1 as u=[0 1 0] is mapped onto x=[-1 1 -1] and bit 0 u=[1 0 1] is mapped onto x=[1 -1 1] is used, then for a bit 1 transmission, (3) is written in (4) as $$r = -\frac{1}{\sqrt{n_t}}(h_1 + h_3 - h_2) + n \quad (4)$$

while for bit 0 transmission we have in (5)

$$r = \frac{1}{\sqrt{n_t}}\{(h_1 + h_3) - h_2\} + n \quad (5)$$

At the receiver, simple minimum noise detection algorithm can be used where the noise, n1 for a bit 1 is given in (6) as $$n1 = r + (h_1 + h_3) - h_2 \quad (6)$$

While the noise, n0 for a bit 0 is given in (7) as $$n0 = r - (h_1 + h_3) + h_2 \quad (7)$$

The likelihood detector gives the minimum noise distance d over the symbol alphabet λ as $$d = \min_\lambda([n1, n0]) \quad (8)$$

If n1>n0, a bit 0 is decoded to have been transmitted, otherwise a bit 1 is decoded.

Transmission of symbols is repeated for a given number of times $n_{rpt}$, and the decoded bit 1 or bit 0 is recorded each time into a decoded bit vector.

If the number of bit 0's in the decoded bit vector is more that the number of bit 1's in the decoded vector of bits, then a bit 0 is decided to have been transmitted, otherwise a bit 1 is decided.

From (1) to (5), it is noticeable that the radiated power will be divided by $n_t$, which will lead to the use of low power amplifiers and saving on energy consumption.

In terms of reliability due to diversity paths, if one link to a given station is off, then diversity paths provided by the other antennas will be used to deliver to intended information. Notice also that even if only one link is good, it is possible to decode the message since orthogonal symbols are mapped to different antennas.

Moreover the system provides a better security system because multiple paths are decoded at each time and the mapping or de-mapping table may not be known to an eavesdropper.

Figure 6:
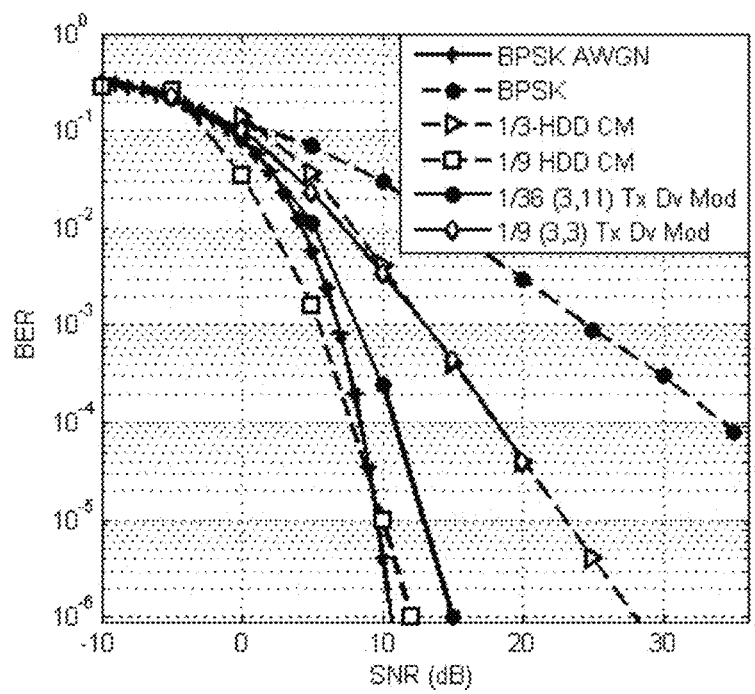
FIG. 6 shows the first results of detection bit error rates (BER) achieved through flat Rayleigh fading channels.

FIG. 6 shows the first results of detection bit error rates achieved through additive white Gaussian channels and flat fading Rayleigh channels. BPSK AWGN represents conventional binary phase-shift keying modulation in AWGN noise where there is neither fading nor repetition. BPSK Rayleigh also shows a case of no repetition in a flat-frequency fading Rayleigh channels. 1/3-CCM (3,0) is a rate=1/3 and a case of colored codeword modulation where orthogonal bits are repeated from the same antenna, without repetition, while in the codewords are repeated twice in rate 1/9 system 1/9-CCM (3,0). The 1/9 (3,2) Tx Ant Dv Mod is a rate=1/9 system for transmit antenna diversity modulation, where different symbols are transmitted from three antennas and the same transmission repeated twice.

The 1/36 (3,11) Tx Ant Dv Mod is a rate=1/36 system for transmit antenna diversity modulation, where different symbols are transmitted from three antennas and the same transmission repeated eleven times. From the slopes of the curves, it is clear that the diversity order remains the same for colored codeword modulation scheme and the transmit antenna diversity modulation (TADM) system.

Colored Sequence Modulation

The present invention relies on novel concepts of communication, in which the input bits at a transmitter are used to map a known frequency sequence codeword set, and then a signal is transmitted, one by one, in the order of the sequence as selected by the input bits. Since a sequence of length M can be arranged in several ways to form a sequence alphabet $M_s$=2(M!+M), the present invention results in very high data rate transmission in single carriers. Transmission of the next carrier signal is effected only after the symbol period of the previous carrier signal has elapsed, thus the carriers are orthogonal. This CFCM scheme is consistent with a single carrier orthogonal frequency division (SC-OFD) system. The total number of bits in the sequence mapper space is given as $\log_2 \lfloor (M_s) \rfloor$, where $\lfloor \cdot \rfloor$ denotes the lower value for binary bits.

In the generalised form of CFCM, referred to as Gunda rut code, sequence mapping can also be used to map additional bits in the conventional modulation space of the alphabet $M_c$. The total data rates can then be given as ($\log_2 \lfloor (M_s) \rfloor$ + $\log_2 M_c + \log_2 \lfloor (N_g) \rfloor$), where $N_g$ is the number of sequence groupings. As a result, the CFCM coding method and accompanying apparatus is desirable in increasing data rates and applicable in storage, energy-saving, secure, deep space, optical, mobile and fixed communications industries.

For better signal equalization, a pulse shaper is used at the transmitter to produce the signal, which is transmitted on a single OFDM sub-carrier at a time. A Gaussian-like power spectral density is desired for such applications. At the receiver, simple threshold detection is set to detect the received frequency carrier bin.

However, it is clear that the features of the proposed colored CFCM codeword coding can be implemented independently, including increasing data rates through multiple-input multiple-output systems, non-systematic coding, non-log-likelihood decoding and mapping or de-mapping tables, without going beyond the scope of the present invention.

Figure 7:
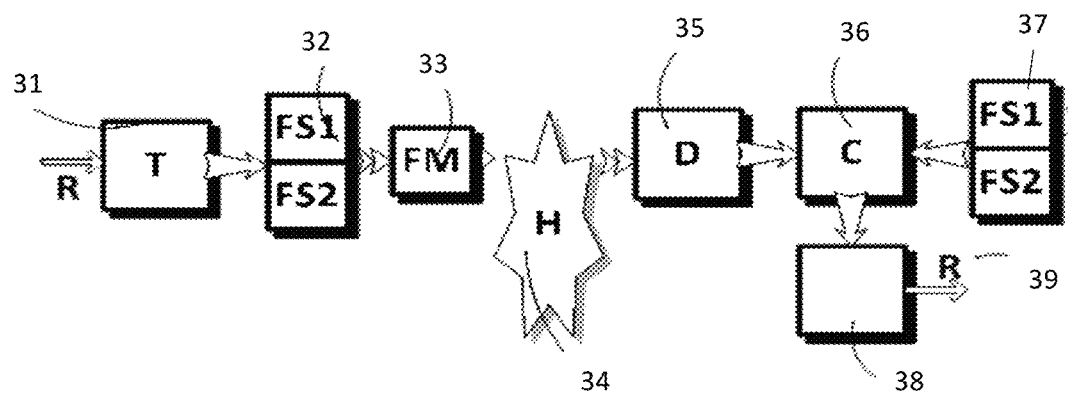
FIG. 7 Shows a block diagram illustrating a communications system with CFCM modulation.

The following give the meaning of the letters in FIG. 7: (R) refers to some random input information bit vector. The bit vector (R) selects the sequence to be transmitted to the receiver based on the mapping table in T. The orthogonal frequency bins are given in the known reference frequency sequence codewords (FS1) and (FS2) in 32 that contain different sequences. Here, only (FS1) and (FS2) codewords are given, but several may be implemented. (FM) in (33) refers to frequency modulation, which determines what frequency bin to use in transmitting a given signal. Several frequency carriers can be produced in (FM) through a switching oscillator. The components in (31), (32) and (33) of FIG. 7 refer to the transmitter. The well-known OFDM system technology is used to create the (FM) carriers. However, FFT is not performed on all sub-carriers, but one. The first sub-carrier in the selected sequence is singly transmitted to the receiver in the first time slot through the channel (H), which is shown in (34) of FIG. 7. The process is followed for all the sub-carriers in the sequence. The subcarrier is produced by a switching oscillator in the (FM) in (33). The use of a switching oscillator is better than the use of multiple oscillators due to synchronization timing. However, all the reference sequences are also known at the receiver as depicted in the de-mapping table (T) of (38). It is assumed that time synchronization between the receiver and the transmitter is good enough so that the sub-carrier frequency is exactly extracted in its time slot at the receiver. Similarly, (D) in (35) denotes a signal equalizer and decoding detector. Several filters are used to decode different frequency sub-carriers. The decoded sequence output of the detector in (35) is loaded into a comparator (C) in (36). The decoded sequence is then compared to the sequences in the reference sequences in (37), through the use of the de-mapping table (T) in (38). The components in (35), (36), (37) and (38) of FIG. 7 refer to the receiver. The bits (R) in (39) that correspond to the decoded sequence are then read out as the conveyed output bits.

TABLE V

| Random input bits | Codeword colour |
|---|---|
| 0 | f1 |
| 1 | iFFT(f1, f2) |

Table V Illustrates a mapping table for one bit, which is similar to a de-mapping table. Considering the first table of Table V, an input bit 0 is mapped to the frequency bin f1 and the bit 1 is mapped to the frequency bin that processes inverse fast Fourier transform (iFFT) on the bin f1 and f2. An arbitrary signal of positive amplitude is then transmitted to the receiver after performing an iFFT on it. It is important to note that the frequency bins could be antennas of groups of antennas.

Figure 8:
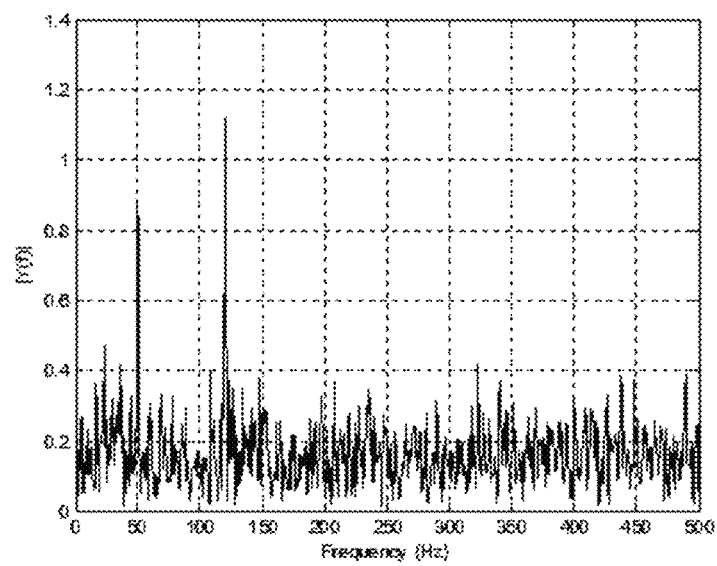
FIG. 8 Shows spectrum of two frequency elements as decoded at the receiver.

FIG. 8 depicts the receiver's normalized FFT output sample spectrum for the bit 1 at 0 dB of bit-energy-to-noise-ratio (EbN0). It can be seen that only the bin at f1=50 and f2=120 qualify for the positive detection of bit 1, because the amplitude is greater than δ=0.6. In fact, the less complex Goertzel algorithm may also be used instead of FFT for short sequence detection.

TABLE VI

| Bits | Repeat Sequence |
|---|---|
| 0000 | (f1), (f1), (f1) |
| 0001 | (f1), (f1), (f2) |
| 0010 | (f1), (f1), (f3) |
| 0011 | (f1), (f2), (f2) |
| 0100 | (f1), (f2), (f3) |
| 0101 | (f1), (f3), (f2) |
| 0110 | (f2), (f2), (f2) |
| 0111 | (f2), (f2), (f1) |
| 1000 | (f2), (f2), (f3) |
| 1001 | (f2), (f1), (f1) |
| 1010 | (f2), (f3), (f1) |
| 1011 | (f2), (f1), (f3) |
| 1100 | (f3), (f3), (f3) |
| 1101 | (f3), (f3), (f1) |
| 1110 | (f3), (f3), (f2) |
| 1111 | (f3), (f2), (f2) |

Table VI Illustrates a mapping table for three frequency bins, which is similar to a de-mapping table. On the contrary, when a colored CFCM modulation is implemented, it is observed that data rates are improved. The second table of Table VI shows the sequence mapping for different frequency sub-carriers. In the basic form, the same signal is transmitted in all the different sub-carriers. That signal may just have positive amplitude only without quadrature or in-phase components. As a consequence of the mapping in Table VI just three frequency bins can be mapped in different ways to convey four bits to the receiver. These frequency bin sequences present different colors in terms of the uniqueness of the members in the codeword, and hence the name colored modulation.

Following the mapping concept in Table VI, it can be shown that when there are three bins and above, then the sequence alphabet is computed as $M_s=2(M!+M)$ and the number of binary bits conveyed in the mapper is given as $b_s=\log_2 \lfloor (M_s) \rfloor$. For example, for 4 bins, 52 sequences can be developed, of which 32 can be used to convey five bits. Furthermore, the other 30 sequences may still be used to convey additional 4 sequences of 4-bit input vectors e.t.c. The selection of the sequences of these 30 frequency bins can be decided based on prevailing interference conditions. Such a scheme greatly increases the data rates in OFDM system.

In a mathematical form, and as before, the received signal vector r of the codeword in additive white Gaussian noise n is written in (a) as $$r=hx+n \qquad (a)$$

where h represents a channel gain between the sender and the receiver and where x is mapped onto frequency bins at unity amplitude, for example. For the AWGN channel, the channel gain is given as h=1.

The detector at the receiver then estimates the bin that has been transmitted by checking the bin that has amplitude greater than the threshold δ=0.6, and decodes the frequency at that bin to have been used in transmission. The detection is possible through well-known FFT algorithms.

De-mapping then follows by reading the conveyed bits from the mapping table by looking into the detected frequency bin sequences.

Figure 9:
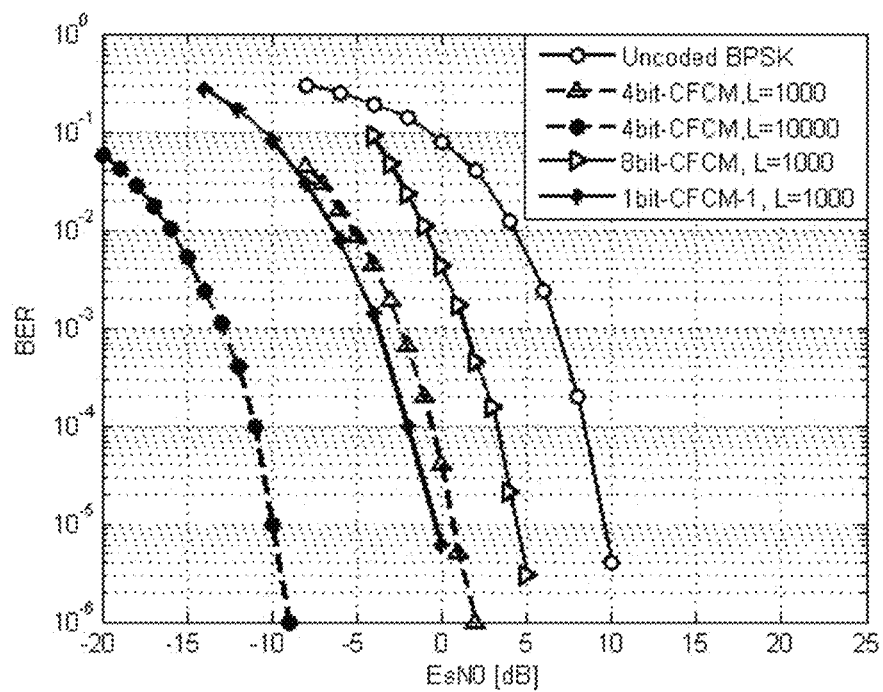
FIG. 9 Illustrates bit error rates for proposed Gunda Rut code for CFCM modulation.

FIG. 9 depicts the bit error rates (BER) obtained for the CFCM system compared to un-coded binary-phase-shift keying modulation (BPSK) at code rate R=1. The BER results of Gunda rut codes, is obtained from the mapping system of Table V and Table VI. The frequency bin that has amplitude beyond 0.6 is detected as the one that had been transmitted. The main observation is that, when the selected carrier is sampled with larger FFT points e.g. 1000 and 10000, then the reliability improves significantly. In the case of CFCM system, the FFT length is consistent with a coding length that is used in other channel coding schemes that compute reliability of bit positions from large numbers of received signals e.g. Polar codes, turbo codes and LDPC codes.

Figure 10:
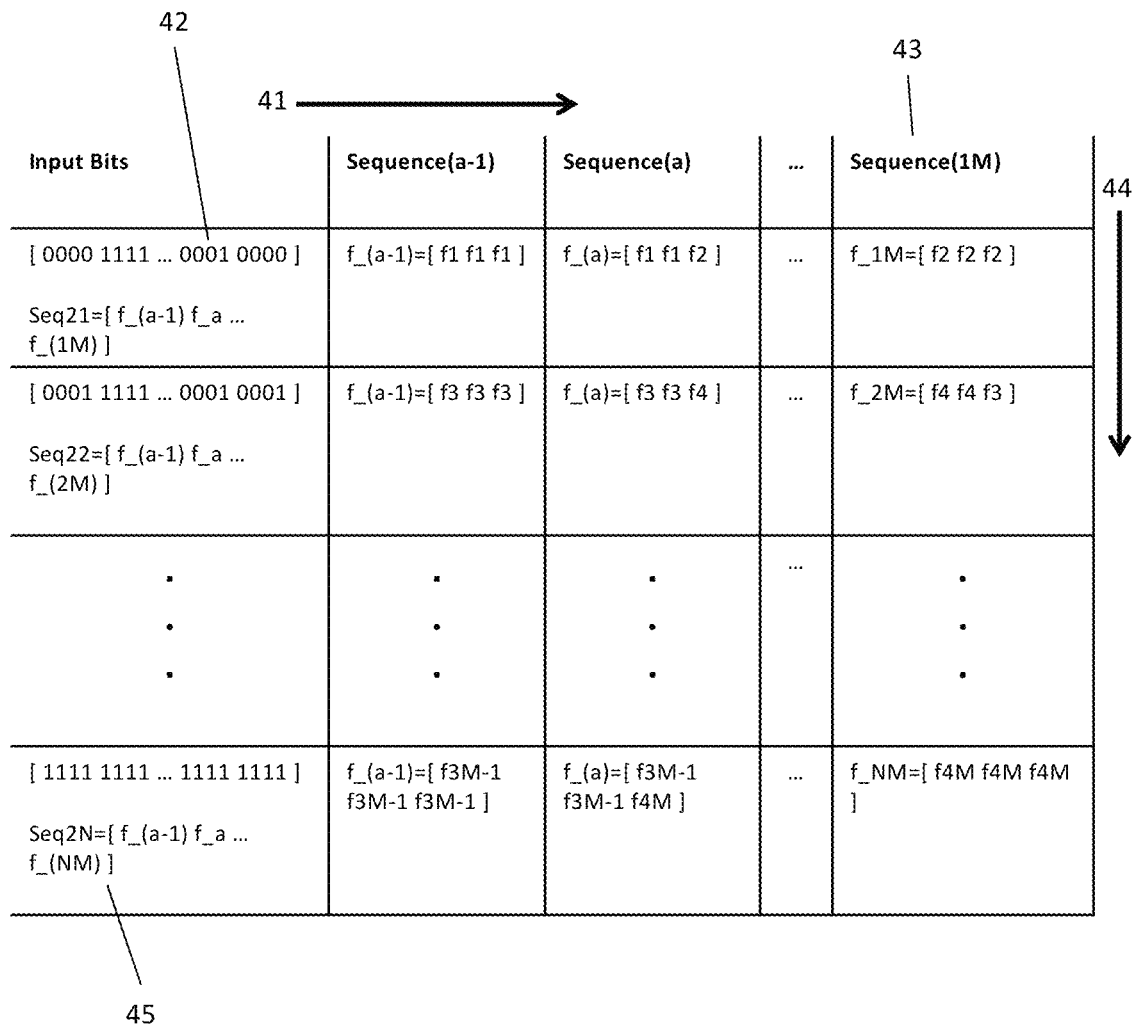
FIG. 10 Illustrates a mapping table for groups of frequency sequences, which is similar to a de-mapping table.

The sequence method has a very large mapping table. In order to further increase data rates at affordable mapping table space in the present invention, a mapping system is given in FIG. 10 that illustrates how sequence mapping is used to implement any 2-subcarrier sequence symbol to convey 8 bits. In FIG. 10, the arrow labeled (41) is a mapping direction for a first constellation of the first four bits that select the frequency bin sequence in each frequency group, consisting of M alphabets. Then, in the first column (the "Input Bits" column), the first entry in each row (one of which is labeled (42) for clarity) represents the bits that select the frequency bin sequence in the selected group. The column labeled (43) shows the last sequence of the first group of frequency bins i.e. f1M=[f2,f2,f2], where f2 is repeated for the three occasions. The arrow labeled (44) in FIG. 10 shows direction of second constellation of the second four bits that select the frequency bin group out of N possible groups that carry two frequency bins that consist of three sequences. Finally, within the Input Bits column, the second entry in each row (one of which is labeled (45) for clarity) is the group of bits that select the frequency group from where the sequence to be transmitted is selected. The frequency bin to be selected is given as $f_{i,j}$, $i \in 1:M$ and $j \in 1:N$. Any group j is selected by 4 bits and the frequency bins denoted by i of the selected group j are arranged in any of the forms given in the mapping table similar to that of Table VI thus conveying additional 4 bits. At the receiver, the detector determines the sequence of the frequency bins to determine the first 4 bits according to the Table VI and then checks the group of the frequency bins to determine the next 4 bits according to the table in FIG. 10, hence a total of 8 bits are relayed from only 3 frequency bins at a time.

Moreover, CSCM can be configured in terms of antennas activation sequences or sequences from ports. Table VII illustrates a two-antenna system where the sequence of transmission is used to convey information with two bits. For example, if the input bits in 00, antenna one, a1 transmits in the first time slot and the second time slot. At the receiving end, if that sequence (a1, a1) is detected, then the bits 00 are decoded and no error occurs.

TABLE VII

| Bits | Repeat Sequence |
| --- | --- |
| 00 | (a1), (a1) |
| 01 | (a1), (a2) |
| 10 | (a2), (a1) |
| 11 | (a2), (a2) |

Further mapping of information can be implemented in the example of Table VIII, where the sequence of groups of antennas or routes or ports or base stations is used to convey information.

TABLE VIII

| Bits | Repeat Sequence |
| --- | --- |
| 00 | (a1; a2), (a1; a2) |
| 01 | (a1; a2), (a2; a3) |
| 10 | (a2; a3), (a1; a2) |
| 11 | (a1; a3), (a1; a3) |
| 100 | (a1; a3), (a2; a3) |
| 101 | (a2; a3), (a1; a3) |
| 110 | (a2; a3), (a2; a3) |
| 111 | (a1; a2), (a1; a3) |

In the following paragraphs, the performance of present invention in terms of data rates and PAPR is compared with the conventional M_ary OFDM for M=64 and M=256 that employ 8QAM modulation. In the first case where M=64 OFDM subcarriers, the conventional OFDM system conveys 156 (3 8QAM bits×52 subcarriers) bits and the PAPR is proportional to 64γ, where γ is some value for power ratio.

On the other hand, Gunda Rut OFDM code presents 168 ((4 group bits+4 sequence bits)×(21 sub-symbols in the 64 bandwidth)) bits without any higher order modulation. In addition, the PAPR is proportional to γ and channel error coding is not necessary in order to achieve lower BER.

Furthermore, in the M=64 OFDM case, the sequence can be formed from only two frequency bins to convey 2 bits from 32 frequency groups i.e. [00, 01, 10, 11] is mapped on to the sequences [f1/1, f1/2, f2/1, f2/2], respectively. As such, Gunda Rut FDM code presents 224 ((5 group bits+2 sequence bits)×(32 sub-symbols in the 64 bandwidth)) bits without any higher order modulation. In addition, the PAPR is proportional to γ and channel error coding is not necessary in order to achieve lower BER. Note that the data rate has reduced from 246 to 224 bits but the mapping table search size has also reduced from $2^{(246)}$ to just 32 in length. Compared to conventional BPSK with OFDM, there is an increase in data rates in the order of 224/52=4.3 or beyond 400% at better BER and lower PAPR. Considering negative values increases data rates even further to 8 bits per constellation.

In summary, the example of the invention presents a system method where data rates are comparable to using 32QAM in 64-OFDM which possesses higher PAPR and higher BER.

Sequence OFDM

The present invention relies on novel concepts of communication, in which input bits at a transmitter are used to map some known orthogonally multiplexed frequency sequence codeword set, and then an OFDM signal is transmitted, one by one, in the order of the sequence as selected by the input bits. Since a sequence of length M can be arranged in several ways to form a sequence alphabet $M_s=2(M!+M)$, the present invention results in very high data rate transmission in sub-OFDM symbol carriers. Transmission of the next sub-OFDM symbol carrier signal is effected only after the symbol period of the previous carrier signal has elapsed, thus the carriers are orthogonal. This COFCM scheme is consistent with a single sub-OFDM carrier frequency modulation (SOC-FM) system.

In the simple way of mapping the sequences for the sub-OFDM symbols only, the total number of bits in the sequence mapper space is given as $\log_2 \lfloor (M_s) \rfloor$, where $\lfloor (\cdot) \rfloor$ denotes the lower value for binary bits.

In the generalised form of COFCM, referred to as Gundarut code i.e. generalised under new design approach with read under table, sequence mapping can also be used to map additional bits in the conventional symbol modulation space of the alphabet $M_c$ e.g. Mary quadrature amplitude modulation (QAM). The total data rates can then be given as $(\log_2 \lfloor (M_s) \rfloor + \log_2 M_c)$. As a result, the COFCM coding method and accompanying apparatus is desirable in increasing data rates.

Furthermore, with well devised mapping table for the frequency sequences in the sub-OFDM symbols, upto at least 104 additional bits will be conveyed to the receiver with even better reliability as compared to 64 bits in BPSK OFDM with 64 sub-carriers.

For better signal equalization, a pulse shaper is used at the transmitter to produce the signal, which is transmitted on a single sub-OFDM symbol carrier at a time. A Gaussian-like power spectral density is desired for such applications. At the receiver, simple threshold detection is set to detect the received frequency carrier bins.

However, it is clear that the features of the proposed colored COFCM codeword coding can be implemented independently, including increasing data rates through multiple-input multiple-output systems, non-systematic coding, non-log-likelihood decoding and mapping or de-mapping tables, without going beyond the scope of the present invention.

Figure 11:
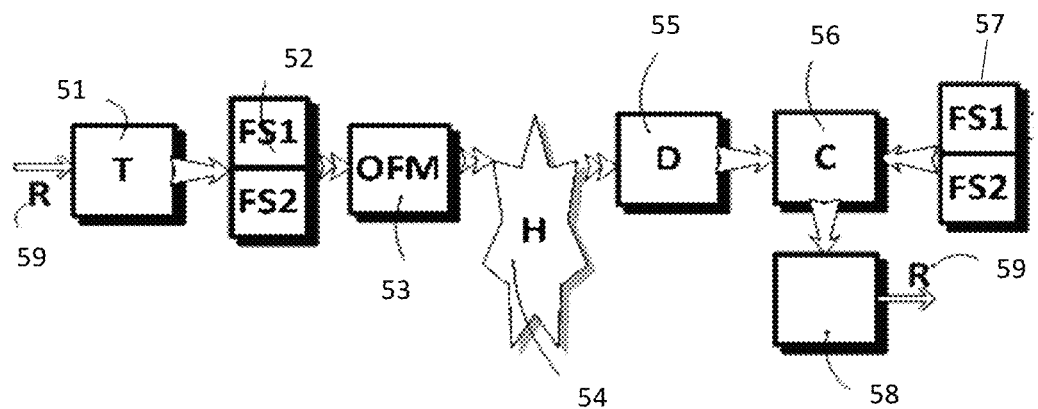
FIG. 11 Shows a block diagram illustrating a communications system with COFCM modulation.

The following give the meaning of the letters in FIG. 11:
(R) refers to some random input information bit vector. The bit vector (R) selects the sequence to be transmitted to the receiver based on the mapping table (T) in (51). The orthogonal frequency bins are given in the known reference frequency sequence codewords (FS1) and (FS2) in (52) that contain different sequences. Here, only (FS1) and (FS2) codewords are given, but several may be implemented. (OFM) in (53) refers to orthogonal frequency modulation which determines what frequency bins to use in transmitting a given OFDM signal. Several frequency carriers can be produced in (OFM) through a switching oscillator. The well-known OFDM system technology is used to create the (OFM) carriers. The components (R), (T), (FS1), (FS2) and (OFM) form the transmitter. The well-known FFT is performed on all sub-carriers that make a sub-OFDM symbol. The sub-OFDM carrier in the selected sequence is positioned in a symbol frame to be transmitted to the receiver in the first time slot through the channel (H), which is shown in (54) of FIG. 11. The process is followed for all the sub-OFDM carriers in the sequence. Each subcarrier is produced by a switching oscillator in the (OFM) in (53). The use of a switching oscillator is better than the use of multiple oscillators due to synchronization timing. However, all the reference sequences are also known at the receiver as depicted in the de-mapping table (T) of (58). It is assumed that time synchronization between the receiver and the transmitter is good enough so that the sub-OFDM symbol carrier frequencies are exactly extracted in their time slot at the receiver. Similarly, (D) in (55) denotes a signal equalizer and decoding detector. Several filters are used to decode different frequency sub-carriers. The decoded sequence output of the detector (D) in (55) is loaded into a comparator (C) in (56). The decoded sequence is then compared to the sequences in the reference sequences in (FS1) and (FS2) in (57), through the use of the de-mapping table (T) in (58). The bits that correspond to the decoded sequence are then read out as the conveyed output bits as (R) in (59) that are mapped out of the sequence information, which is expected to be the same as input bits (R). The components (55), (56), (57), (58) and (59) form the receiver.

Considering Table IX which shows a sequence mapping table for sub-OFDM symbols, an input bit vector [0000] is mapped to repeat frequency subcarriers given as [f1, f1, f1], thus forming one sub-OFDM symbol, where f1 is just a single frequency bin. For example, we see that three frequency bins can be implemented to carry four bits in Table IX. In total, there are 16 sequences that can be formed out of 3 sub-carriers. A detector at a receiver performs a threshold detection to determine the sequence with a sum amplitude that is $\delta > (3 \times z)$, where z is the amplitude threshold value for a single subcarrier.

This method implies that in a similar OFDM symbol with 64 carriers, then $(4/3 \times 64=)84$ bits will be conveyed even without the conventional higher order modulation. However, a receiver has to detect these frequency sequences within the OFDM symbol of three sub-carriers. The good fact is that few FFT operations are required for the detection of 3 OFDM symbol subcarriers alone.

TABLE IX

| Bits | OFDM subcarriers |
|------|------------------|
| 0000 | (f1), (f1), (f1) |
| 0001 | (f1), (f1), (f2) |
| 0010 | (f1), (f1), (f3) |
| 0011 | (f1), (f2), (f3) |
| 0100 | (f1), (f3), (f3) |
| 0101 | (f2), (f3), (f3) |
| 0110 | (f3), (f3), (f3) |
| 0111 | (f2), (f2), (f2) |
| 1000 | (f2), (f2), (f1) |
| 1001 | (f2), (f2), (f3) |
| 1010 | (0), (0), (f1) |
| 1011 | (0), (f2), (0) |
| 1100 | (f3), (0), (0) |
| 1101 | (0), (f2), (f1) |
| 1110 | (f3), (0), (f1) |
| 1111 | (f3), (f2), (0) |

Figure 12:
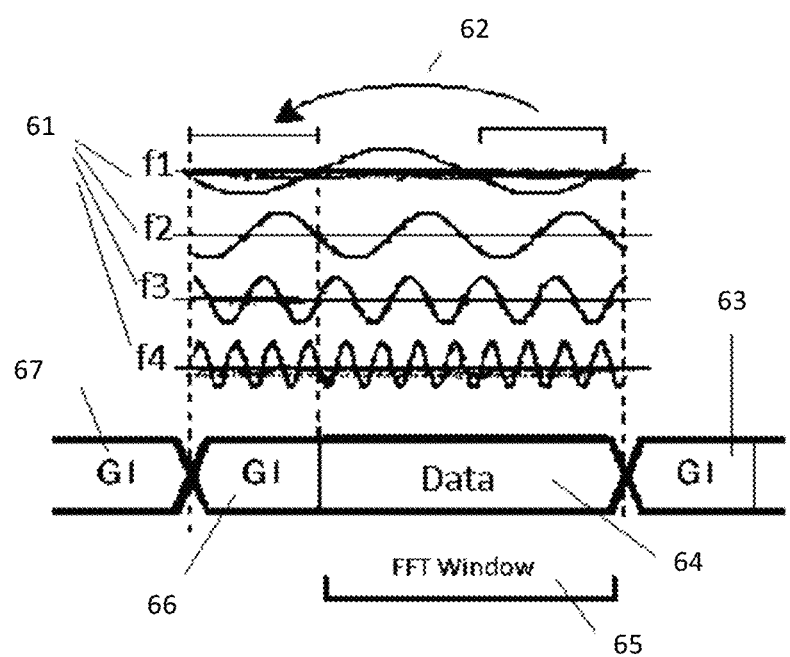
FIG. 12 Illustrates a representation of an addition of four OFDM symbol subcarriers.

In FIG. 12, (61) represent the frequency carriers that are added up together to obtain an OFDM symbol. The OFDM symbol consists of two cyclic extensions shown as (62), one being in the guard interval denoted as GI in (66) and (63), while another is within the data bits (64). The FFT window in (65) is the actual length of the OFDM symbol that contains required information. The OFDM symbol is preceded by another guard interval (67) of the previous OFDM symbol.

In a mathematical form, as before, the received signal vector r of the codeword in additive white Gaussian noise n is written in (a) as $$r = hx + n \quad (a)$$

where h represents a channel gain between the sender and the receiver and where x is mapped onto frequency bins at unity amplitude, for example. For the AWGN channel, the channel gain vector is given as h=1.

The detector at the receiver then estimates the bin that has been transmitted by checking the bin that has amplitude greater than the threshold $\delta = 0.6$, and decodes the frequency at that bin to have been used in transmission. The detection is possible through well-known FFT algorithms.

De-mapping then follows by reading the conveyed bits from the mapping table by looking into the detected frequency bin sequences in the sub-OFDM symbol and also the group from which the detected sub-OFDM symbol originates.

The detector at the receiver will determine an amplitude threshold for each frequency bin in order to determine the bin(s) that was used at the transmitter to form the received OFDM symbol.

Figure 13:
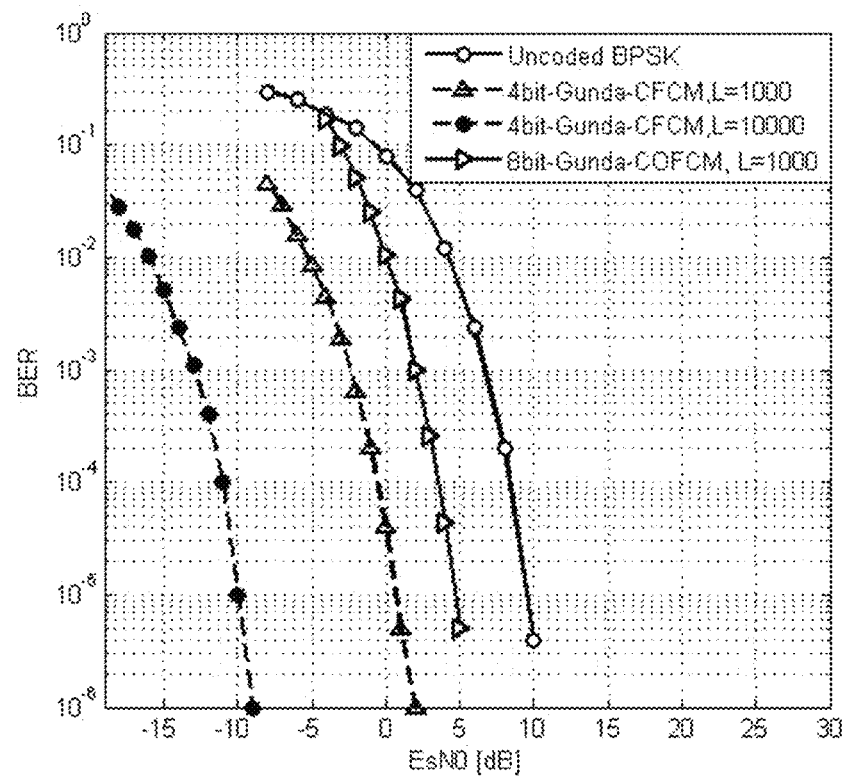
FIG. 13 Shows bit error rate results for Gunda Rut code of COFCM modulation.

Results for bit error rates (BER) against various signal-to-noise power ratio (SNR) are shown in FIG. 13 with an FFT length of L=1000. The BER results are obtained by setting an amplitude threshold of δ3>δ2>δ1, where they correspond to different number of frequency bins. For example, if the sub-OFDM symbol consists of f3 only, the detector checks whether the received amplitude is beyond δ3 for f3 bin.

It now becomes clear that in an M=64 OFDM system which conveys 64 bits, an equivalent of 21 sub-OFDM symbols can be generated to convey (21×4) 84 bits at even lower peak-to-average-power ratio (PAPR), which is dependent on only three subcarriers instead of 64.

However, another method for conveying at least 64 symbols with lower PAPR is to map only the frequency bins that are selected by bit 1. Any frequency bin that is selected by bit 0 is not combined in the OFDM symbol for transmission. This mapping results in index modulation.

In order to further increase data rates from 4 bits to 8 bits in the present invention, a mapping table is given in Table X that illustrates how 16 OFDM subcarrier groups of 3 subcarriers can be selected to implement any 3-subcarrier sub-OFDM symbol. The frequency groups vary from f_g1 to f_g16. Any group is selected by 4 bits and the frequency bins of the selected group are arranged in any of the forms given in the mapping table of Table IX thus conveying additional 4 bits. At the receiver, the detector determines the sequence of the frequency bins to determine the first 4 bits according to the table in Table IX and then checks the group of the frequency bins to determine the next 4 bits according to the table in Table X, hence a total of 8 bits are relayed from only 3 frequency bins.

In the following paragraphs, the performance of present invention in terms of data rates and PAPR is compared with the conventional M_ary OFDM for M=64 and M=256 that employ 8QAM modulation. In the first case where M=64 OFDM subcarriers, the conventional OFDM system conveys 156 (3 8QAM bits×52 subcarriers) bits and the PAPR is proportional to 64γ, where γ is some value for power ratio.

TABLE X

| Bits | OFDM subcarrier group |
|---|---|
| 0000 | (f_g1) = [f1 f2 f3] |
| 0001 | (f_g2) = [f4 f5 f6] |
| 0010 | (f_g3) = [f7 f8 f9] |
| 0011 | (f_g4) = [f10 f11 f12] |
| 0100 | (f_g5) = [f13 f14 f15] |
| 0101 | (f_g6) = [f16 f17 f18] |
| 0110 | (f_g7) = [f19 f20 f21] |
| 0111 | (f_g8) = [f22 f23 f24] |
| 1000 | (f_g9) = [f25 f26 f27] |
| 1001 | (f_g10) = [f28 f29 f30] |
| 1010 | (f_g11) = [f31 f32 f33] |
| 1011 | (f_g12) = [f34 f35 f36] |
| 1100 | (f_g13) = [f37 f38 f39] |
| 1101 | (f_g14) = [f40 f41 f42] |
| 1110 | (f_g15) = [f43 f44 f45] |
| 1111 | (f_g16) = [f46 f47 f48] |

On the other hand, Gunda Rut OFDM code presents 168 ((4 group bits+4 sequence bits)×(21 sub-symbols in the 64 bandwidth)) bits without any higher order modulation. In addition, the PAPR is proportional to 3γ and channel error coding is not necessary in order to achieve lower BER.

Moreover, only two subcarriers may be used to convey two bits in a sub-OFDM symbol (i.e. [00, 01, 10, 11] mapped onto [0f1, 0f2, f1/2, f2/2]), thus forming 32 groups whose final group consists of f64, where a total of 224 ((2+5)×32) bits are conveyed at a PAPR that is proportional to 2γ and very low BER without necessity for channel coding.

In the second case where M=256 OFDM subcarriers, the conventional OFDM system conveys 624 (3 8QAM bits x 208 subcarriers) bits and the PAPR is proportional to 256γ, where γ is some value for power ratio.

On the other hand, Gunda rut OFDM code presents 640 ((6 group bits+4 sequence bits)×(64 sub-symbols in the 256 bin bandwidth)) bits without any higher order modulation. In addition, the PAPR is proportional to 3γ and channel error coding is not necessary in order to achieve lower BER.

Alternatively, a single step repetition may be implemented in the frame of symbols by sending MQAM symbols in the preceding sequences which will already be known at the transmitter.

Various non-limiting aspects of the invention are described below.

In an aspect is a method for encoding, the method comprising: (a) determining from a mapping table a codeword corresponding to a first bit from a string of bits, the mapping table comprising a codeword of type 1 and a codeword of type 2, wherein the codeword of type 1 and the codeword of type 2 are orthogonal bit vectors, wherein the length of the codeword of type 1 and the length of the codeword of type 2 are equal integers greater than 1; (b) sending the codeword corresponding to the first bit to a port; and (c) repeating steps (a) and (b) for each subsequent bit from the string of bits. Various embodiments are described below.

In embodiments of the above method (and throughout the methods described herein), the method includes encoding (i.e., embedding) the codeword onto an electromagnetic communication signal wherein the communication signal is an electromagnetic signal or an electronic signal. Such encoding may be by any suitable method for encoding data onto a signal, which methods are known in the art. For example the signal is a transient electromagnetic signal and the encoding involves modulating the signal with the codeword as digital information. Such encoding may occur prior to sending the signal to a port, and from the port the signal is further sent to an antenna or cable for transmission via a medium.

In further embodiments, the method may comprise transmitting the codeword corresponding to the first bit from the port via a wireless or physical medium.

The method may comprise receiving, by a receiver, the transmitted codeword corresponding to the first bit.

The method may comprise comparing, by the receiver, the received codeword corresponding to the first bit to the mapping table to determine the identity of the first bit from the string of bits.

The method may comprise identifying, by the receiver, a single bit and corresponding bit position from the received codeword, and estimating the identity of the received codeword based on the single bit and bit corresponding position.

The method may comprise identifying, by the receiver, a total number of bits of type 0 or type 1 within the received codeword, and estimating the identity of the received codeword based on the total number of bits of type 0 or type 1.

The method may comprise deciding an estimated input bit to be a bit 0 or a bit 1 if a majority of the bits in the codeword is a bit 0 or a bit 1.

The method may comprise selection decoding by the receiver, the selection decoding comprising detecting one bit from the codeword at a time, where only a received signal with the highest power is decoded as a bit 1 or a bit 0 and the position of that decoded bit in the received signal is recorded as a decoded bit position.

In embodiments, the method generates a set of codewords, each codeword in the set of codewords corresponding to a bit in the string of bits, and wherein the method comprises sending the set of codewords to the port.

In embodiments, the length of the codeword of type 1 and the length of the codeword of type 2 are equal integers in the range of 2-6, such as 2, 3, 4, 5, or 6, or may be greater than 6.

The method may comprise transmitting the codeword corresponding to the first bit from the port via a wireless or physical medium a predetermined number of times, wherein the transmitting comprises transmitting the predetermined number of times such that a receiver will know the predetermined number of times.

The method may comprise transmitting the codeword corresponding to the first bit from the port via a wireless or physical medium, and receiving, by a receiver, the transmitted codeword corresponding to the first bit, and comparing, by the receiver, the received codeword corresponding to the first bit to the mapping table to determine the identity of the first bit from the string of bits, and identifying, by the receiver, a single bit and corresponding bit position from the received codeword, and estimating the identity of the received codeword based on the single bit and bit corresponding position.

The method may include generating an output at the receiver based on the received signal, the output configured for use by a device to alter a user interface, generate an audible or visual signal, initiate an automatic process (e.g., an automatic alert, an automatic change to a computer system or data stored by a computer system, or the like), alter an access setting or other setting in a computer system or other device, alter a database or other data structure stored in a device, or the like. Furthermore the method may include altering the transmitting device (i.e., the station or other device used to generate the encoded signal), such as by altering the device to record that a signal with encoded digital information was generated and sent to a port and/or transmitted via a medium, or by automatically changing a setting on the transmitting device.

In an aspect is a method for encoding, the method comprising: generating a set of codewords from an input string of bits by determining, from a mapping table, a corresponding codeword for each bit from the input string of bits, wherein the mapping table comprising a codeword of type 1 and a codeword of type 2, wherein the length of the codeword of type 1 and the length of the codeword of type 2 are equal integers greater than 1 (e.g., integers equal to 2, 3, 4, or more than 4); formatting the set of codewords for transmission by a medium; and sending the formatted set of codewords to a port. In an embodiment, the method may comprise: transmitting the set of codewords from the port via a wireless or physical medium; receiving, by a receiver, the transmitted set of codewords; and comparing, by the receiver, the received set of codeword to the mapping table to determine the identity of the bits in the string of bits.

In embodiments, transmission of the codewords is by any standard method of transmission, including those now known and later developed. Examples include multiplexing methods, including Frequency Division Multiplexing (FDM) and Orthogonal FDM (OFDM), Time Division Multiplexing, Phase Division Multiplexing, and the like. Other examples include phase shift keying (PSK), Frequency Shift Keying (FSK), Amplitude Modulation (AM), Frequency Modulation (FM), Single Side Band (SSB), and the like. By representing bits with codewords, the method increases signal reliability (among other advantages).

In an aspect is a method for encoding communications, the method comprising: receiving an electromagnetic communication signal, wherein the communication signal is an electromagnetic signal or an electronic signal including embedded digital information, wherein the digital information is a codeword comprising at least two bits and is selected from a mapping table based on an input bit from an input string of bits; extracting the at least two bits of the codeword; and determining the input bit by comparing the extracted at least two bits of the codeword to the mapping table. In an embodiment, the method may comprise: repeating the receiving, extracting, and determining for a plurality of codewords corresponding to a plurality of bits in an input string of bits.

In an aspect is a method for encoding, the method comprising: (a) determining from a mapping table a codeword corresponding to a first bit from a string of bits, the mapping table comprising a codeword of type 1 and a codeword of type 2, wherein the codeword of type 1 and the codeword of type 2 are orthogonal bit vectors of length n such that the codeword corresponding to the first bit from a string of bits is a bit vector of length n; (b) sending each bit from the codeword corresponding to the first bit to a separate port in an array of at least n ports; and (c) repeating steps (a) and (b) for each subsequent bit from the string of bits. Embodiments of the method are provided below.

In embodiments, n is equal to 2, 3, 4, 5, or more than 5, or in the range of 2-6.

In embodiments, each port in the array of at least n ports that receives a bit is configured to transmit the received bit, and wherein the transmitting by the array of ports is configured for Time Division Multiplexing.

In embodiments, each port in the array of at least n ports that receives a bit is configured to transmit the received bit, and wherein the n ports transmit in a predetermined sequence.

The method may comprise transmitting the codeword corresponding to the first bit from the array of at least n ports via a wireless or physical medium.

The method may comprise receiving, by a receiver, the transmitted codeword corresponding to the first bit.

The method may comprise comparing, by the receiver, the received codeword corresponding to the first bit to the mapping table to determine the identity of the first bit from the string of bits.

In embodiments, each port in the array of at least n ports that receives a bit is configured to transmit the received bit, and wherein the transmitting by the array of ports is configured for Time Division Multiplexing, and further comprising transmitting the codeword corresponding to the first bit from the array of at least n ports via a wireless or physical medium.

In embodiments, each port in the array of at least n ports that receives a bit is configured to transmit the received bit, and wherein the transmitting by the array of ports is configured for Time Division Multiplexing, and further comprising transmitting the codeword corresponding to the first bit from the array of at least n ports via a wireless or physical medium, and further comprising receiving, by a receiver, the transmitted codeword corresponding to the first bit, and further comprising comparing, by the receiver, the received codeword corresponding to the first bit to the mapping table to determine the identity of the first bit from the string of bits.

The method may comprise modulating all input bits in the bit vector of the codeword to form modulated symbols, and mapping the modulated symbols through a mapping table, to be transmitted by respective transmit antennas.

The method may comprise a step of repeating transmission of the modulated symbols through a channel between the sender and the receiver, where the number of repetitions is known to both the sender and the receiver.

In an aspect is a method for encoding, the method comprising: (a) generating a set of codewords from an input string of bits by determining, from a mapping table, a corresponding codeword for each bit from the input string of bits, wherein the mapping table comprising a codeword of type 1 and a codeword of type 2, wherein the codeword of type 1 and the codeword of type 2 are orthogonal bit vectors of length n; (b) formatting the set of codewords for transmission by a medium; and (c) sending the formatted set of codewords to an array of at least n ports such that, for each codeword from the set of codewords, each bit in the codeword is sent to a separate port. In embodiments, the at least n ports are interlinked and configured such that they transmit according to a Time Division Multiplexing scheme. In embodiments, the at least n ports are interlinked and configured such that they transmit according to a predetermined sequence.

In an aspect is a method for encoding communications, the method comprising: receiving an electromagnetic communication signal, wherein the communication signal is an electromagnetic signal or an electronic signal including embedded digital information, wherein the digital information is a codeword comprising n bits, wherein n is at least two, and the codeword is selected from a mapping table based on an input bit from an input string of bits, and wherein the n bits of the codeword have been transmitted via n transmit antenna connected to n ports on a transmitter; extracting the n bits of the codeword; and determining the input bit by comparing the extracted n bits of the codeword to the mapping table.

In embodiments of the above method, the digital information comprises a set of codewords, each codeword containing n bits transmitted via n transmit antenna connected to n ports on a transmitter, and wherein the method further comprises: extracting n bits for each codeword in the set of codewords; and determining a string of input bits by comparing the extracted n bits for each codeword in the set of codewords to the mapping table.

In embodiments of the above method, the electromagnetic communication signal comprises variable signal strengths, and where the method further comprises isolating a relatively strongest signal strength and determining the embedded digital information from the relatively strongest signal strength.

The method may further comprise decoding, through a detector, the received electromagnetic communication signal by detecting a minimum noise signal formed from two orthogonal codewords of type 1 and type 2; where only the noise signal with the smallest absolute value is detected as a codeword type 1 or type 2.

In an aspect is a method for encoding, the method comprising: (a) generating, from a mapping table, a codeword corresponding to a bit from an input string of bits, wherein the mapping table comprises a codeword of type 1 and a codeword of type 2, wherein the codeword of type 1 is a vector containing n elements in a predetermined order and the codeword of type 2 is a vector containing n elements in a predetermined order, and wherein the element in each position in the codeword of type 1 is different from the element in the corresponding position in the codeword of type 2; (b) formatting the codeword for transmission by a medium; and (c) sending the formatted codeword to a port.

In embodiments of the above method, the elements are selected from frequencies and ports.

The method may further comprise transmitting the formatted codeword via a medium such that the predetermined order of the elements forming the codeword is maintained during the transmission.

The method may further comprise receiving the n elements of the codeword and maintaining, at the receiver, the transmitted order of the n elements.

The method may further comprise decoding the codeword by comparing the received formatted codeword to the mapping table.

The method may further comprise repeating steps (a)-(c) for each bit in the input string of bits.

In an aspect is a method for encoding, the method comprising: (a) generating, from a mapping table, a codeword corresponding to a bit from an input string of bits, wherein the codeword is a frequency vector containing n frequencies in a predetermined order; and (b) sending the codeword corresponding to the bit from an input string of bits to a port, wherein the mapping table comprises a codeword of type 1 containing n frequencies and a codeword of type 2 containing n frequencies, and the frequency in each position in the codeword of type 1 is different from the frequency in the corresponding position in the codeword of type 2.

The method above may further comprise repeating transmission in each frequency of the codeword through a channel between a sender and a receiver, where the number of repetitions is known to both the sender and the receiver and the frequencies in the sequence of the codeword is transmitted one frequency at a time until all the frequencies in the codeword have been transmitted to the receiver.

The method above may further comprise formatting the codeword by applying an inverse Fourier Transform (IFT) function (e.g., an IFFT function) prior to transmission.

In embodiments of the above method, the n frequencies in the codeword of type 1 and then frequencies in the codeword of type 2 are selected from two or three different frequencies.

In an aspect is a method for encoding communications, the method comprising: receiving an electromagnetic communication signal, wherein the communication signal is an electromagnetic signal or an electronic signal including embedded information, wherein the embedded information is a codeword comprising n elements, wherein n is at least two, and the codeword is selected from a mapping table and represents an input bit from an input string of bits, and wherein the n elements of the codeword are assigned a discrete transmission time slot in a prearranged sequence; extracting the n elements of the codeword; and determining the input bit by comparing the extracted n elements of the codeword to the mapping table. Certain embodiments are provided below.

In embodiments, the elements are frequencies or ports.

In embodiments, the extracting comprises applying a FT function (e.g., a FFT function) to the received electromagnetic communication signal.

In embodiments, the extracting comprises applying a FT function to the received electromagnetic communication signal, where only the frequency with the highest power beyond a predetermined threshold is decoded as a frequency 1 or a frequency 2 and the position of that decoded frequency 1 or frequency 2 in the received signal is recorded;

In embodiments, the embedded information comprises a plurality of codewords, and wherein the method comprises repeating the extracting for each codeword.

In an aspect is a method for orthogonal frequency division multiplexing (OFDM) communications, the method comprising: receiving an electromagnetic OFDM communication signal, wherein the OFDM communication signal is an electromagnetic signal or an electronic signal including embedded digital information, wherein the digital information comprises a bit from an input string of bits and is encoded by selecting, from a mapping table, an ordered set of frequencies corresponding to the bit from the input string of bits, and applying an inverse FT function (e.g., an inverse fast Fourier Transform or IFFT) to the ordered set of frequencies; extracting the ordered set of frequencies from the OFDM communication signal by applying a FT function (e.g., a Fast Fourier Transform or FFT function); and determining the bit from the input string of bits by comparing the extracted ordered set of frequencies to the mapping table. Certain embodiments are provided below.

In embodiments, the ordered set of frequencies comprises at least three frequencies that may be the same or different and are independently selected from a group consisting of at least two unique frequencies.

In embodiments, the inverse FT function is used to form a sub-OFDM symbol from the ordered set of frequencies.

In embodiments, the ordered set of frequencies forms a codeword representing the bit from the input string of bits, and wherein the digital information comprises a set of codewords representing the input string of bits.

In embodiments, the inverse FT function is used to form a sub-OFDM symbol from the ordered set of frequencies, and the method further comprises receiving a plurality of sub-OFDM symbols, where the total number of sub-OFDM symbols is known to both a sender and a receiver as a sequence length.

In embodiments, determining the bit from the input string of bits comprises estimating the ordered set of frequencies and comparing the estimated ordered set of frequencies to the mapping table.

In an aspect is a method for encoding, the method comprising: (a) generating, from a mapping table, a codeword corresponding to a bit from an input string of bits, wherein the mapping table comprises a plurality of codeword types, each codeword type in the mapping table comprising a unique sequence of n orthogonal frequencies; (b) formatting the codeword for transmission by a medium by applying an inverse Fourier Transform function on the codeword; and (c) sending the formatted codeword to a port. The method may further comprise transmitting via a medium the formatted codeword for receipt by a receiver. The method may further comprise receiving, by a receiver, the formatted codeword and applying a Fourier Transform function on the formatted codeword to recover a sequence of n orthogonal frequencies corresponding in a mapping table to the bit from the input string of bits. In an aspect is a method for communicating information, comprising: (a) using a mapping table at a sender, encoding an input bit 0 to a codeword type 1 and an input bit 1 to a codeword type 2, wherein the codeword type 1 is a block containing a frequency vector of frequency 1 and frequency 2, and where the codeword type 2 is a block containing a frequency vector of frequency 1 and frequency 2, but the position of frequency 1 and frequency 2 in the codeword type 1 is not the same as the position of frequency 1 and frequency 2 in the codeword type 2; (b) forming a sub-OFDM symbol from the encoded codeword type 1 and codeword type 2, through an inverse Fourier transform algorithm; and (c) transmitting the sub-OFDM symbol through a channel between a sender and a receiver, where the total number of transmissions is known to both the sender and the receiver as a sequence length. Certain embodiments are provided below.

In embodiments, the transmitted sub-OFDM symbols are received as received signals at the receiver.

The method may further comprise: decoding, through a detector and Fourier transform, the received signals by detecting the frequencies in the received signal, wherein only the frequency of the received signal with the highest power beyond a given threshold is decoded as a frequency 1 or a frequency 2 and a position or positions of that decoded frequency 1 or frequency 2 in the received signals is recorded; and repeating the decoding for all sub-OFDM symbols in the received signal.

The method may further comprise comparing, via a comparator module, the decoded frequency positions to the positions of frequencies in the mapping table, and recording an estimated codeword if the positions of the decoded frequencies are similar to positions of similar frequencies in a codeword in the mapping table.

The method may further comprise de-mapping, with the mapping table, the sub-OFDM symbol by reading out bit 0 or bit 1 that corresponds to each of the recorded estimated codeword types.

In embodiments, the mapping table may contain a plurality of frequencies other than frequency 1 and frequency 2, and a plurality of bit 0 or plurality of bit 1 are assigned to these frequencies in the mapping table.

In embodiments, the methods herein further comprise decoding and formatting received digital information and further processing the information. For example, the digital information may represent computer instructions and/or data, and such information may be further processed by a microprocessor, an input/output (I/O) device for display or otherwise communicating to a user, and the like. For example, the methods may include decoding received digital information (from an encoded electromagnetic signal) and outputting the information via a user interface, or using the information to control and change the state of a microprocessor, or the like. In embodiments, the methods herein include decoding the encoded information by a receiver in receipt of the encoded signal (e.g., by a component within a receiver station or receiver system), recovering the original input bit and/or input string of bits, and further processing the recovered input bit or input string of bits by the receiving device. Such further processing may include, for example, altering a user interface to display information (or otherwise convey information, such as audibly conveying information) represented by the recovered bit or input string of bits, or altering a system to implement instructions represented by the recovered bit or input string of bits, or storing the recovered bit or input string of bits in a memory module, or the like. The methods and devices here may be configured to enable transmission of cryptographically encoded information (e.g., wherein the input string of bits is itself cryptographically encoded prior to being encoded by the methods herein) and may therefore include additional steps of decoding such information.

In an aspect is a system for carrying out any of the methods described herein. Such systems may comprise, for example, various components and modules as described herein and will be recognized by an ordinary artisan as necessary or desirable for carrying out such methods. Examples of such components and modules include coding and decoding modules, ports, transmitting circuitry, power amplification and/or rectification circuitry, microprocessing units, memory units, I/O units, and the like.

In an aspect, the invention discloses a method of conveying information from a sender to a receiver by use of repeated bit codeword patterns given in a mapping table and detection through selection decoding through a de-mapping table (i.e., a mapping table used in reverse) so as to improve reliability of signals in communications industry, where an input binary bit 1 selects a pattern that is orthogonal to that selected by bit 0. Encoding process is generalized under new design approach with read under table (Gunda rut) decoding, thus referred to as gunda rut coding. The receiver is able to perform hard-decision detection even without a soft-input decoder, thus very simple to implement and the method has very low implementation complexity. The design method is applicable in low transmit power, energy-saving, secure, low latency, storage and in military, mobile, optical, deep space and fixed telecommunication systems for long range transmission and reliable information.

The invention also discloses a method for increasing reliability of information through transmit antenna diversity modulation from a sender to a receiver by repeating transmission of unique antenna symbols from several antennas. The antenna symbols are given in a mapping table, where detection of the received symbols at the receiver is made through simple minimum noise detection. De-mapping is performed through a de-mapping table. Input information bit 1 selects a group of bits as symbols to be transmitted by different transmit antennas, where the group of bits are orthogonal to those transmitted when antenna symbols are selected by input information bit 0. The receiver is able to perform hard-decision detection even without a soft-input decoder, thus very simple to implement and the method has very low implementation complexity. The method is applicable in systems where low power, energy-saving, secure, military, mobile, optical, and fixed communication systems.

The invention also discloses a method for conveying information to a receiver by mapping of sequence codeword patterns using a mapping table at an encoder of a sender and detection through parameter thresholds at a detector of a receiver then demapping through a de-mapping table, where source sequences also convey information to the receiver to improve data rates. This colored sequence codeword modulation (CSCM) method leads to additional improved data rates in the order of at least $\log_2 \lfloor (M_s) \rfloor$, where $M_s=2(M!+M)$ is the number of possible sequences and M is the length of a single sequence of single-carriers plus $\lfloor \log_2(N_g) \rfloor$ bits, which are mapped on to symbol groups $N_g$. The source can be frequency, routes, antennas or ports or a combination of antennas or ports or routes. The design method is applicable in low transmit power, energy-saving, secure, low latency, storage and in mobile, deep space, optical and fixed communication systems.

The present disclosure is also directed to a method for conveying information to a receiver by mapping of input bits to some orthogonally multiplexed frequency sequence codeword patterns at an encoder of a sender and detection at a receiver through parameter thresholds, where orthogonal frequency division multiplexing (OFDM) sub-OFDM symbol sequences also convey information to the receiver to improve data rates, in addition to conventional OFDM symbols. This colored OFDM codeword modulation (COFCM) method leads to additional data rates in the order of $\lfloor \log_2(M_s) \rfloor$, where $M_s=2(M!+M)$ is the number of possible sequences and M is the maximum number of subcarriers of a sub-OFDM symbol plus $\lfloor \log_2(N_g) \rfloor$ bits, which are mapped on to sub-OFDM symbol groups $N_g$. The design method is applicable in interference environment and in low transmit power, energy-saving, secure, low latency, storage and in mobile, deep space, optical and fixed telecommunication systems.

As mentioned herein, some of the advantages of the systems and methods described include improved reliability of transmission of information. Various methods and benchmarks may be used to quantify the improvement in reliability compared with other known methods, and these methods and benchmarks (as well as their application) are known in the art.

It will be appreciated that all methods described herein are intended to be suitable for implementation on standard/known or later developed communication equipment. Such systems for implementing the methods herein are intended to be within the scope of the invention. It will further be appreciated that, where specialized equipment is desirable for implementing the methods or any portions of the methods herein, preparation and operation of such equipment will be within the scope of the art and will not require more than minimal/routine optimization by one of ordinary skill in the art.

It is to be understood that while the invention has been described in conjunction with examples of specific embodiments thereof, that the foregoing description and the examples that follow are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains. The pertinent parts of all publications mentioned herein are incorporated by reference. All combinations of the embodiments described herein are intended to be part of the invention, as if such combinations had been laboriously set forth in this disclosure.

The invention claimed is:

1. A method for communicating using encoding, the method comprising:
   (a) determining from a mapping table a codeword corresponding to a first bit from a string of bits, the mapping table comprising a codeword of type 1 and a codeword of type 2, wherein the codeword of type 1 and the codeword of type 2 are orthogonal bit vectors, wherein the length of the codeword of type 1 and the length of the codeword of type 2 are equal integers greater than 1;
   (b) sending the codeword corresponding to the first bit to a port;
   (c) repeating steps (a) and (b) for each subsequent bit from the string of bits,
   and further comprising:
   transmitting the codeword corresponding to the first bit from the port via a wireless or physical medium;
   receiving, by a receiver, the transmitted codeword corresponding to the first bit; and
   selection decoding by the receiver, the selection decoding comprising detecting one bit from the codeword at a time, where only a received signal with the highest power is decoded as a bit of type 1 or a bit of type 0 and the position of that decoded bit in the received signal is recorded as a decoded bit position.

2. The method of claim 1, further comprising comparing, by the receiver, the received codeword corresponding to the first bit to the mapping table to determine the identity of the first bit from the string of bits.

3. The method of claim 1, further comprising identifying, by the receiver, a single bit and corresponding bit position from the received codeword, and estimating the identity of the received codeword based on the single bit and bit corresponding position.

4. The method of claim 1, further comprising identifying, by the receiver, a total number of bits of type 0 or bits of type 1 within the received codeword, and estimating the identity of the received codeword based on the total number of bits of type 0 or bits of type 1.

5. The method of claim 1, comprising deciding an estimated input bit to be a bit of type 0 or a bit of type 1 if a majority of the bits in the codeword is a bit of type 0 or a bit of type 1.

6. The method of claim 1, wherein the method generates a set of codewords, each codeword in the set of codewords corresponding to a bit in the string of bits, and wherein the method comprises sending the set of codewords to the port.

7. The method of claim 1, wherein the length of the codeword of type 1 and the length of the codeword of type 2 are equal integers in the range of 2-6.

8. The method of claim 1, further comprising transmitting the codeword corresponding to the first bit from the port via a wireless or physical medium a predetermined number of times, wherein the transmitting comprises transmitting the predetermined number of times such that a receiver will know the predetermined number of times.

9. A method for communicating using encoding, the method comprising:
(a) determining from a mapping table a codeword corresponding to a first bit from a string of bits, the mapping table comprising a codeword of type 1 and a codeword of type 2, wherein the codeword of type 1 and the codeword of type 2 are orthogonal bit vectors of length n such that the codeword corresponding to the first bit from a string of bits is a bit vector of length n;
(b) sending each bit from the codeword corresponding to the first bit to a separate port in an array of at least n ports;
(c) repeating steps (a) and (b) for each subsequent bit from the string of bits.

10. The method of claim 9, wherein each port in the array of at least n ports that receives a bit is configured to transmit the received bit, and wherein the transmitting by the array of ports is configured for Time Division Multiplexing.

11. The method of claim 9, wherein each port in the array of at least n ports that receives a bit is configured to transmit the received bit, and wherein the n ports transmit in a predetermined sequence.

12. The method of claim 9, further comprising transmitting the codeword corresponding to the first bit from the array of at least n ports via a wireless or physical medium.

13. The method of claim 12, further comprising receiving, by a receiver, the transmitted codeword corresponding to the first bit.

14. The method of claim 9, wherein each port in the array of at least n ports that receives a bit is configured to transmit the received bit, and wherein the transmitting by the array of ports is configured for Time Division Multiplexing, and further comprising transmitting the codeword corresponding to the first bit from the array of at least n ports via a wireless or physical medium.

15. The method of claim 9, wherein each port in the array of at least n ports that receives a bit is configured to transmit the received bit, and wherein the transmitting by the array of ports is configured for Time Division Multiplexing, and further comprising transmitting the codeword corresponding to the first bit from the array of at least n ports via a wireless or physical medium, and further comprising receiving, by a receiver, the transmitted codeword corresponding to the first bit, and further comprising comparing, by the receiver, the received codeword corresponding to the first bit to the mapping table to determine the identity of the first bit from the string of bits.

* * * * *